United States Patent
Kim et al.

(10) Patent No.: US 9,496,934 B2
(45) Date of Patent: Nov. 15, 2016

(54) METHOD AND DEVICE FOR TRANSMITTING AND RECEIVING SIGNALS BY USING CODEBOOK IN WIRELESS COMMUNICATION SYSTEM

(71) Applicant: LG ELECTRONICS INC., Seoul (KR)

(72) Inventors: Hyungtae Kim, Seoul (KR); Kijun Kim, Seoul (KR); Hanjun Park, Seoul (KR); Youngtae Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/759,629

(22) PCT Filed: Jan. 9, 2014

(86) PCT No.: PCT/KR2014/000244
§ 371 (c)(1),
(2) Date: Jul. 7, 2015

(87) PCT Pub. No.: WO2014/109567
PCT Pub. Date: Jul. 17, 2014

(65) Prior Publication Data
US 2015/0349864 A1 Dec. 3, 2015

Related U.S. Application Data

(60) Provisional application No. 61/750,748, filed on Jan. 9, 2013, provisional application No. 61/804,173, filed on Mar. 21, 2013.

(51) Int. Cl.
*H04B 7/04* (2006.01)
*H04B 7/06* (2006.01)
*H04J 11/00* (2006.01)

(52) U.S. Cl.
CPC .......... *H04B 7/0456* (2013.01); *H04B 7/0478* (2013.01); *H04B 7/0626* (2013.01); *H04B 7/0639* (2013.01); *H04J 11/00* (2013.01); *H04B 7/065* (2013.01)

(58) Field of Classification Search
CPC .. H04B 7/0417; H04B 7/0456; H04B 7/046; H04B 7/0469; H04B 7/0473; H04B 7/0639
USPC ........................................................ 375/267
See application file for complete search history.

(56) References Cited

U.S. PATENT DOCUMENTS

2008/0273624 A1 11/2008 Kent et al.
2011/0249637 A1 10/2011 Hammarwall et al.
(Continued)

FOREIGN PATENT DOCUMENTS

KR 10-2010-0132459 12/2010
WO 2012/008710 1/2012
(Continued)

OTHER PUBLICATIONS

Kotecha, et al., "LTE: MIMO Techniques in 3GPP-LTE," Freescale Technology Forum, Nov. 2008, 22 pages.
(Continued)

*Primary Examiner* — Betsy Deppe
(74) *Attorney, Agent, or Firm* — Lee, Hong, Degerman, Kang & Waimey

(57) ABSTRACT

The present invention relates to a wireless communication system. A method by which a base station transmits a downlink signal in a wireless communication system, according to one embodiment of the present invention, comprises the steps of: receiving first and second precoding matrix indicators (PMIs) from a terminal; determining a first matrix (W1) from a first codebook on the basis of the first PMI, determining a second matrix (W2) from a second codebook on the basis of the second PMI, and determining a precoding matrix (W) on the basis of the first matrix (W1) and the second matrix (W2); performing precoding by using the determined precoding matrix (W) at two or more layers to which a downlink signal is mapped; and transmitting a precoded signal to the terminal, wherein all precoding vectors included in the precoding matrix (W) have linear phase increment properties and can be orthonormal to one another.

4 Claims, 13 Drawing Sheets

(56) References Cited

U.S. PATENT DOCUMENTS

2011/0249712 A1* 10/2011 Hammarwall ....... H04B 7/0634 375/220
2012/0219042 A1* 8/2012 Onggosanusi ....... H04B 7/0456 375/219

FOREIGN PATENT DOCUMENTS

| WO | 2012/050364 | 4/2012 |
| WO | 2012093742 | 7/2012 |

OTHER PUBLICATIONS

PCT International Application No. PCT/KR2014/000244, Written Opinion of the International Searching Authority dated Apr. 21, 2014, 21 pages.

European Patent Office Application Serial No. 147377923, Search Report dated Jul. 11, 2016, 9 pages.

\* cited by examiner

FIG. 2
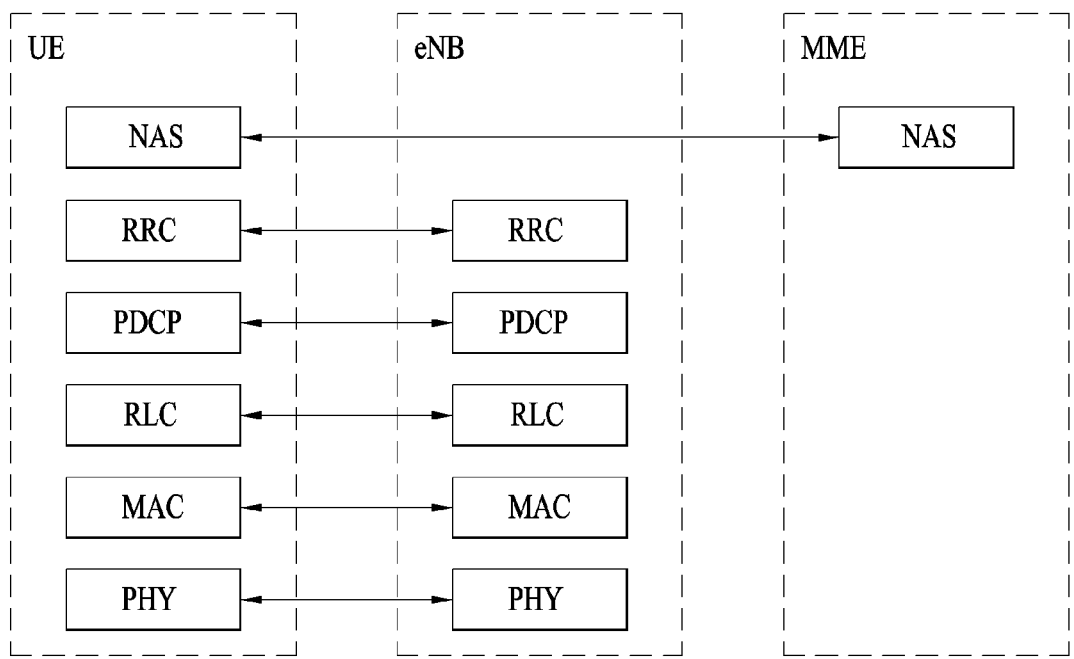
(a) CONTROL-PLANE PROTOCOL STACK
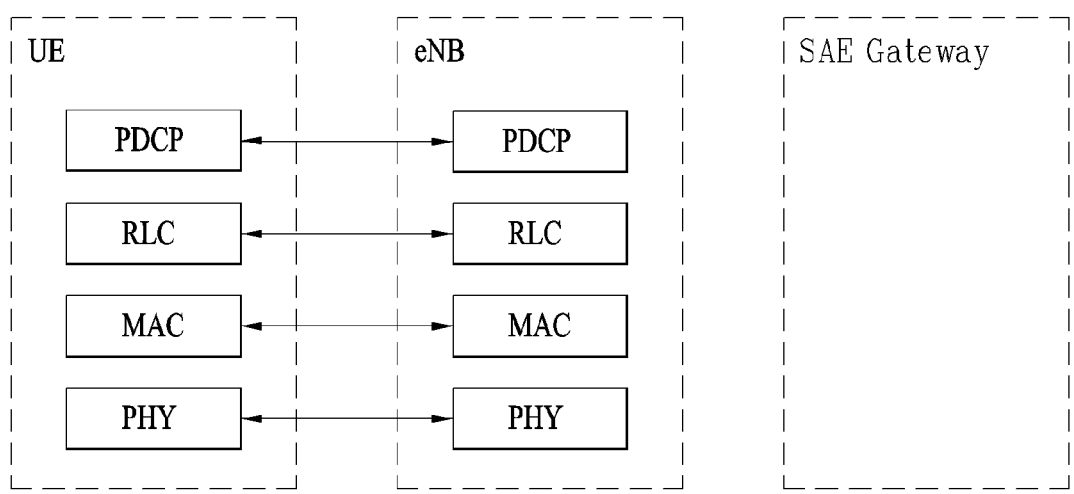
(b) USER-PLANE PROTOCOL STACK

| CQI REPORTING MODE | | PMI FEEDBACK TYPE | |
|---|---|---|---|
| | | NO PMI | SINGLE PMI |
| PUCCH CQI FEEDBACK TYPE | WIDEBAND (WIDEBAND CQI) | MODE 1-0 | MODE 1-1 |
| | UE-SELECTED (SUBBAND CQI) | MODE 2-0 | MODE 2-1 |

FIG. 14
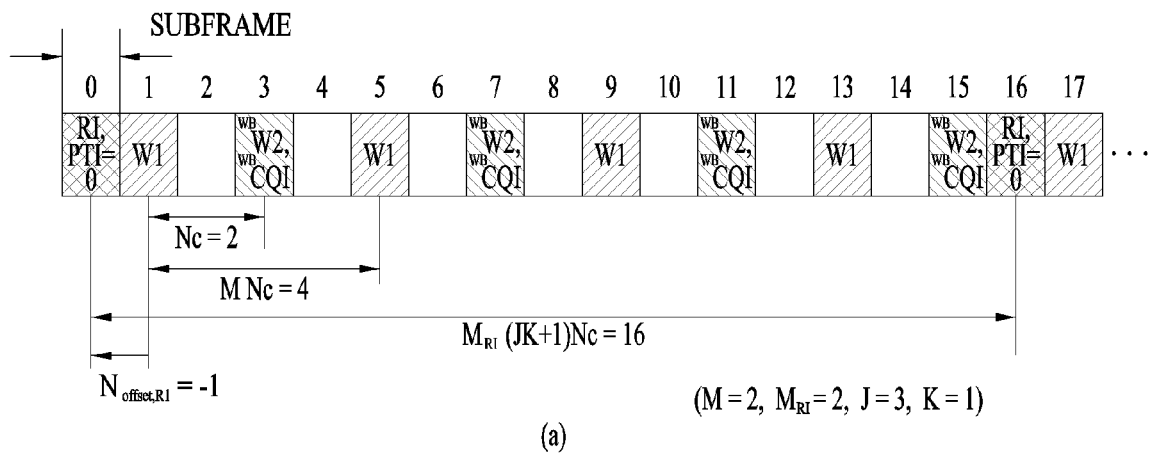
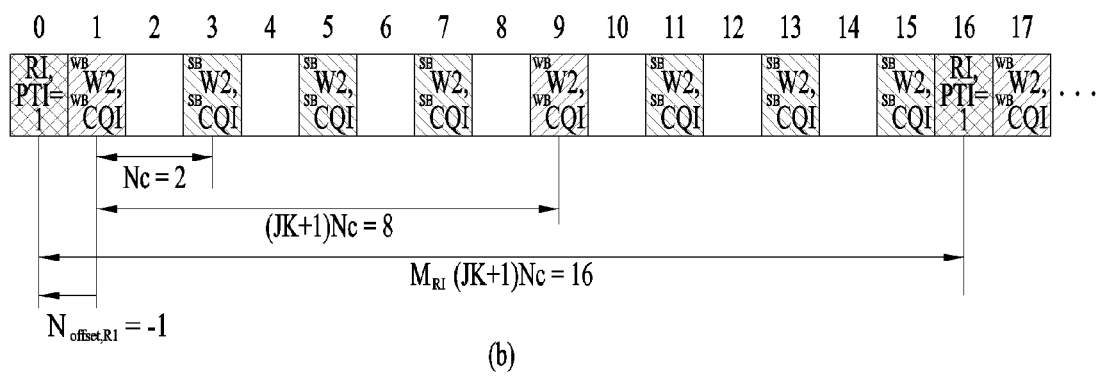
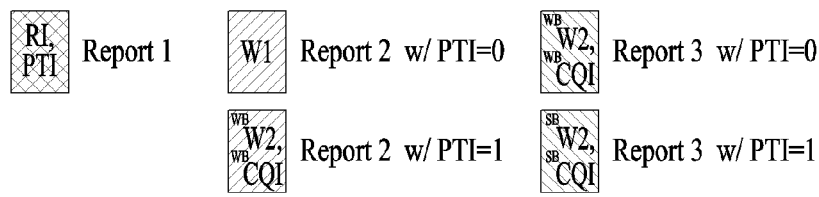

METHOD AND DEVICE FOR TRANSMITTING AND RECEIVING SIGNALS BY USING CODEBOOK IN WIRELESS COMMUNICATION SYSTEM

CROSS-REFERENCE TO RELATED APPLICATIONS

This application is the National Stage filing under 35 U.S.C. 371 of International Application No. PCT/KR2014/000244, filed on Jan. 9, 2014, which claims the benefit of U.S. Provisional Application No. 61/750,748, filed on Jan. 9, 2013 and 61/804,173, filed on Mar. 21, 2013, the contents of which are all hereby incorporated by reference herein in their entirety.

TECHNICAL FIELD

The present invention relates to a wireless communication system, and more particularly, to a method and apparatus for transmitting and receiving a signal using a codebook in a wireless communication system.

BACKGROUND ART

A 3rd generation partnership project long term evolution (3GPP LTE) communication system will be described below as an exemplary mobile communication system to which the present invention is applicable.

FIG. 1 is a diagram schematically showing a network structure of an evolved universal mobile telecommunications system (E-UMTS) as an exemplary radio communication system. The E-UMTS system has evolved from the conventional UMTS system and basic standardization thereof is currently underway in the 3GPP. The E-UMTS may be generally referred to as a long term evolution (LTE) system. For details of the technical specifications of the UMTS and E-UMTS, refer to Release 7 and Release 8 of "3rd generation partnership project; technical specification group radio access network".

Referring to FIG. 1, the E-UMTS includes a user equipment (UE), eNBs (or eNode Bs or base stations), and an access gateway (AG) which is located at an end of a network (E-UTRAN) and connected to an external network. The eNBs may simultaneously transmit multiple data streams for a broadcast service, a multicast service, and/or a unicast service.

One or more cells may exist per eNB. A cell is set to use one of bandwidths of 1.25, 2.5, 5, 10, 15, and 20 MHz to provide a downlink or uplink transport service to several UEs. Different cells may be set to provide different bandwidths. The eNB controls data transmission and reception for a plurality of UEs. The eNB transmits downlink scheduling information with respect to downlink data to notify a corresponding UE of a time/frequency domain in which data is to be transmitted, coding, data size, and hybrid automatic repeat and request (HARQ)-related information. In addition, the eNB transmits uplink scheduling information with respect to UL data to a corresponding UE to inform the UE of an available time/frequency domain, coding, data size, and HARQ-related information. An interface for transmitting user traffic or control traffic may be used between eNBs. A core network (CN) may include the AG, a network node for user registration of the UE, and the like. The AG manages mobility of a UE on a tracking area (TA) basis, wherein one TA includes a plurality of cells.

Although radio communication technology has been developed up to LTE based on wideband code division multiple access (WCDMA), the demands and expectations of users and providers continue to increase. In addition, since other radio access technologies continue to be developed, new technology is required to secure competitiveness in the future. For example, decrease of cost per bit, increase of service availability, flexible use of a frequency band, simple structure, open interface, and suitable power consumption by a UE are required.

Multiple-input multiple-output (MIMO) technology refers to a method for enhancing transmission and receiving data efficiency by employing multiple transmit antennas and multiple receive antennas instead of one transmit antenna and one receive antenna. That is, the MIMO technology enhances capacity or improves performance using multiple antennas in a transmitting end or a receiving end of a wireless communication system. The MIMO technology may also be referred to as multiple antenna technology.

In order to support multiple antenna transmission, a precoding matrix for appropriately distributing transmitted information according to a channel situation and so on can be applied to each antenna.

DISCLOSURE

Technical Problem

An object of the present invention devised to solve the problem lies in a method and apparatus for transmitting and receiving a signal using a codebook in a wireless communication system.

It is to be understood that both the foregoing general description and the following detailed description of the present invention are exemplary and explanatory and are intended to provide further explanation of the invention as claimed.

Technical Solution

The object of the present invention can be achieved by providing a method for transmitting a downlink signal by a base station in a wireless communication system, the method including receiving first and second precoding matrix indicators (PMIs) from a user equipment, determining a first matrix W1 from a first codebook based on the first PMI, determining a second matrix W2 from a second codebook based on the second PMI, and determining a precoding matrix W based on the first matrix W1 and the second matrix W2; performing precoding two or more layers with the downlink signal mapped thereto using the determined precoding matrix W, and transmitting the precoded signal to the user equipment, wherein all precoding vectors included in the precoding matrix W have linear phase increment property and are orthonomal to each other.

In another aspect of the present invention, provided herein is a method for receiving a downlink signal by a user equipment in a wireless communication system, the method including transmitting first and second precoding matrix indicators (PMIs) to a base station, receiving a signal obtained by performing precoding on two or more layers with the downlink signal mapped thereto using a precoding matrix W calculated based on a first matrix W1 determined from a first codebook based on the first PMI and a second matrix W2 determined from a second codebook based on the second PMI, from the base station, and processing the downlink signal using the precoding matrix W, wherein all precoding vectors included in the precoding matrix W have linear phase increment property and are orthonomal to each other.

In another aspect of the present invention, provided herein is a base station for transmitting a downlink signal in a wireless communication system, the base station including a radio frequency (RF) unit, and a processor, wherein the processor is configured to receive first and second precoding matrix indicators (PMIs) from a user equipment, to determine a first matrix W1 from a first codebook based on the first PMI, to determine a second matrix W2 from a second codebook based on the second PMI, to determine a precoding matrix W based on the first matrix W1 and the second matrix W2, to perform performing precoding two or more layers with the downlink signal mapped thereto using the determined precoding matrix W, and to transmit the precoded signal to the user equipment, and all precoding vectors included in the precoding matrix W have linear phase increment property and are orthonomal to each other.

In another aspect of the present invention, provided herein is a user equipment for transmitting channel state information (CSI) in a wireless communication system, the user equipment including a radio frequency (RF) unit, and a processor, wherein the processor is configured to transmit first and second precoding matrix indicators (PMIs) to a base station, to receive a signal obtained by performing precoding on two or more layers with the downlink signal mapped thereto using a precoding matrix W calculated based on a first matrix W1 determined from a first codebook based on the first PMI and a second matrix W2 determined from a second codebook based on the second PMI, from the base station, and to process the downlink signal using the precoding matrix W, and all precoding vectors included in the precoding matrix W have linear phase increment property and are orthonomal to each other.

The following features may be commonly applied to the above embodiments of the present invention.

The first codebook may be configured according to the following equation, $$C^{(1)} = \left\{ \begin{bmatrix} \tilde{W}^{(1)} & 0 \\ 0 & \tilde{W}^{(1)} \end{bmatrix} \middle| \tilde{W}^{(1)} = \begin{bmatrix} w_{4k \bmod 6} & w_{(4k+1) \bmod 6} & w_{(4k+2) \bmod 6} & w_{(4k+3) \bmod 6} & w_{(4k+4) \bmod 6} & w_{(4k+5) \bmod 6} & w_{(4k+6) \bmod 6} & w_{(4k+7) \bmod 6} \end{bmatrix}, k = 0, 1, 2, 3 \right\}.$$

Wn may be configured according to the following equation, $$w_n = \begin{bmatrix} 1 \\ e^{j\frac{2\pi n}{16}} \end{bmatrix}, n = 0, 1, \ldots, 15$$

k may be a precoding vector index of the first codebook.

The second codebook may be configured according to the following equation, $$C_2^{(2)} = \left\{ \begin{bmatrix} Y_1 & Y_2 \\ a_1 Y_1 & -a_2 Y_2 \end{bmatrix}, \begin{bmatrix} Y_1 & Y_2 \\ ja_1 Y_1 & -ja_2 Y_2 \end{bmatrix} \right\}$$

$(Y_1, Y_2) \in \{(e_1, e_5), (e_2, e_6), (e_3, e_7), (e_4, e_8)\}.$ $e_n$ may be a 4-element selection vector with all zeros except the $n^{th}$ element, and $a_1$ and $a_2$ may be configured according to the following equation, $$a_1 = a_2 = e^{2j\left(\frac{2\pi}{16}(4k + l \bmod 4) \bmod 16\right)}.$$

l may be a precoding vector index of the second codebook.

The first codebook may be configured according to the following equation, $$C^{(1)} = \left\{ \begin{bmatrix} \tilde{W}^{(1)} & 0 \\ 0 & \tilde{W}^{(1)} \end{bmatrix} \middle| \tilde{W}^{(1)} = \begin{bmatrix} w_{2k \bmod 8} & w_{(2k+1) \bmod 8} & w_{(2k+2) \bmod 8} & w_{(2k+3) \bmod 8} \end{bmatrix}, k = 0, 1, 2, 3 \right\}.$$

Wn may be configured according to the following equation, $$w_n = \begin{bmatrix} 1 \\ e^{j\frac{2\pi n}{8}} \end{bmatrix}, n = 0, 1, \ldots, 7$$

k may be a precoding vector index of the first codebook.

The second codebook may be configured according to the following equation, $$C_2^{(2)} = \left\{ \begin{bmatrix} Y_1 & Y_2 \\ a_1 Y_1 & -a_2 Y_2 \end{bmatrix}, \begin{bmatrix} Y_1 & Y_2 \\ ja_1 Y_1 & -ja_2 Y_2 \end{bmatrix} \right\}$$

$(Y_1, Y_2) \in \{(e_1, e_3), (e_2, e_4)\}$ $e_n$ may be a 4-element selection vector with all zeros except the $n^{th}$ element, and $a_1$ and $a_2$ may be configured according to the following equation, $$a_1 = a_2 = e^{2j\left(\frac{2\pi}{16}(2k + l \bmod 2) \bmod 8\right)}$$

l may be a precoding vector index of the second codebook.

The first codebook may be configured according to the following equation, $$C^{(1)} = \left\{ \begin{bmatrix} \tilde{W}^{(1)} & 0 \\ 0 & \tilde{W}^{(1)} \end{bmatrix} \middle| \tilde{W}^{(1)} = \begin{bmatrix} w_{2k \bmod 16} & w_{(2k+1) \bmod 16} & w_{(2k+2) \bmod 16} & \cdots & w_{(2k+15) \bmod 16} \end{bmatrix}, k = 0 \right\}.$$

Wn may be configured according to the following equation, $$w_n = \begin{bmatrix} 1 \\ e^{j\frac{2\pi n}{16}} \end{bmatrix}, n = 0, 1, \ldots, 15$$

k may be a precoding vector index of the first codebook.
The second codebook may be configured according to the following equation, $$C_2^{(2)} = \left\{ \begin{bmatrix} Y_1 & Y_2 \\ a_1 Y_1 & -a_2 Y_2 \end{bmatrix}, \begin{bmatrix} Y_1 & Y_2 \\ ja_1 Y_1 & -ja_2 Y_2 \end{bmatrix} \right\}$$

$$(Y_1, Y_2) \in \left\{ \begin{array}{l} (e_1, e_9), (e_2, e_{10}), (e_3, e_{11}), (e_4, e_{12}), \\ (e_5, e_{13}), (e_6, e_{14}), (e_7, e_{15}), (e_8, e_{16}) \end{array} \right\}$$

$e_n$ may be a 4-element selection vector with all zeros except the $n^{th}$ element, and $a_1$ and $a_2$ may be configured according to the following equation, $$a_1 = e^{2j\left(\frac{2\pi}{16}(l \bmod 8)\right)}, a_2 = e^{2j\left(\frac{2\pi}{16}((l \bmod 8)+8)\right)+j\pi}$$

l may be a precoding vector index of the second codebook.

It is to be understood that both the foregoing general description and the following detailed description of the present invention are exemplary and explanatory and are intended to provide further explanation of the invention as claimed.

Advantageous Effects

According to embodiments of the present invention, a method and apparatus for transmitting and receiving a signal using a codebook for effectively supporting MIMO transmission in a wireless communication system.

It will be appreciated by persons skilled in the art that that the effects that could be achieved with the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention, illustrate embodiments of the invention and together with the description serve to explain the principle of the invention.

In the drawings:

FIG. 2 is a diagram illustrating a control plane and a user plane of a radio interface protocol between a UE and an evolved universal terrestrial radio access network (E-UTRAN) based on a 3rd generation partnership project (3GPP) radio access network standard;

FIG. 14 is a diagram illustrating periodic reporting of CSI when a hierarchical codebook is used;

BEST MODE

Figure 1:
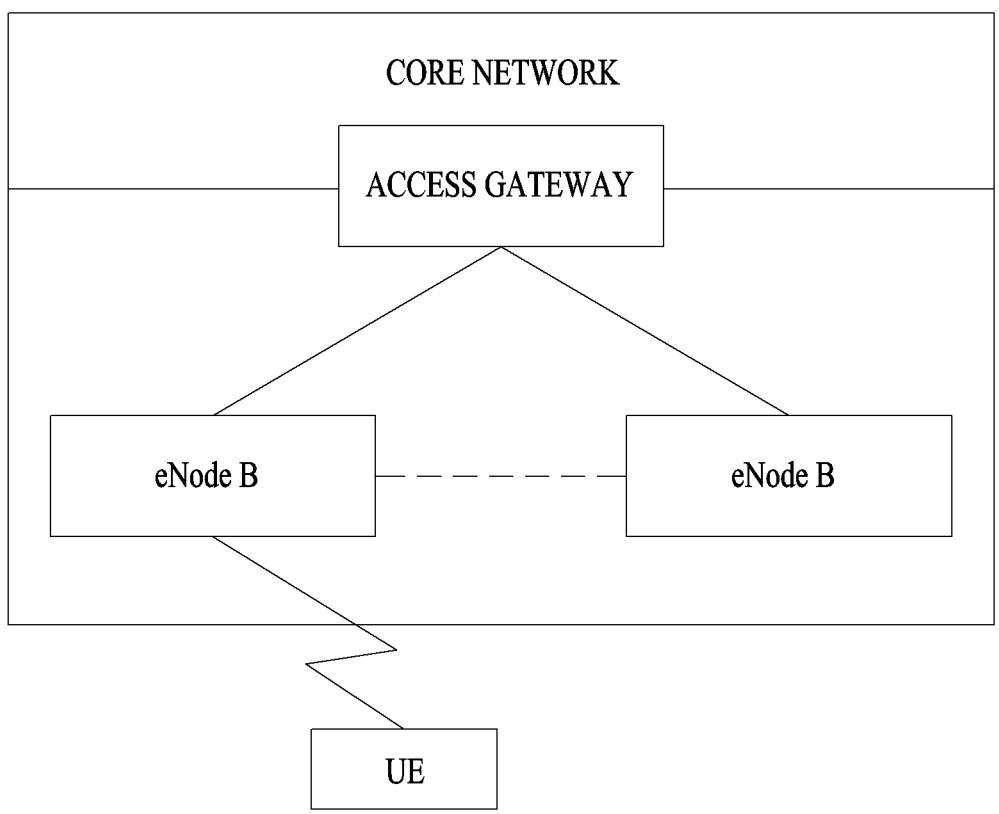
FIG. 1 is a diagram schematically showing a network structure of an evolved universal mobile telecommunications system (E-UMTS) as an exemplary radio communication system.

The configuration, operation and other features of the present invention will be understood by the embodiments of the present invention described with reference to the accompanying drawings. The following embodiments are examples of applying the technical features of the present invention to a 3rd generation partnership project (3GPP) system.

Although, for convenience, the embodiments of the present invention are described using the LTE system and the LTE-A system in the present specification, the embodiments of the present invention are applicable to any communication system corresponding to the above definition. In addition, although the embodiments of the present invention are described based on a Frequency Division Duplex (FDD) scheme in the present specification, the embodiments of the present invention may be easily modified and applied to a Half-Duplex FDD (H-FDD) scheme or a Time Division Duplex (TDD) scheme.

FIG. 2 is a diagram illustrating a control plane and a user plane of a radio interface protocol between a UE and an evolved universal terrestrial radio access network (E-UTRAN) based on a 3GPP radio access network standard. The control plane refers to a path used for transmitting control messages used for managing a call between the UE and the network. The user plane refers to a path used for transmitting data generated in an application layer, e.g., voice data or Internet packet data.

A physical (PHY) layer of a first layer provides an information transfer service to a higher layer using a physical channel. The PHY layer is connected to a medium access control (MAC) layer located on a higher layer via a transport channel. Data is transported between the MAC layer and the PHY layer via the transport channel. Data is also transported between a physical layer of a transmitting side and a physical layer of a receiving side via a physical channel. The physical channel uses a time and a frequency as radio resources. More specifically, the physical channel is modulated using an orthogonal frequency division multiple access (OFDMA) scheme in downlink and is modulated using a single-carrier frequency division multiple access (SC-FDMA) scheme in uplink.

A medium access control (MAC) layer of a second layer provides a service to a radio link control (RLC) layer of a higher layer via a logical channel. The RLC layer of the second layer supports reliable data transmission. The function of the RLC layer may be implemented by a functional block within the MAC. A packet data convergence protocol (PDCP) layer of the second layer performs a header compression function to reduce unnecessary control information for efficient transmission of an Internet protocol (IP) packet such as an IPv4 packet or an IPv6 packet in a radio interface having a relatively small bandwidth.

A radio resource control (RRC) layer located at the bottom of a third layer is defined only in the control plane and is responsible for control of logical, transport, and physical channels in association with configuration, re-configuration, and release of radio bearers (RBs). The RB is a service that the second layer provides for data communication between the UE and the network. To accomplish this, the RRC layer of the UE and the RRC layer of the network exchange RRC messages. The UE is in an RRC connected mode if an RRC connection has been established between the RRC layer of the radio network and the RRC layer of the UE. Otherwise, the UE is in an RRC idle mode. A Non-Access Stratum (NAS) layer located above the RRC layer performs functions such as session management and mobility management.

One cell of the eNB is set to use a bandwidth such as 1.25, 2.5, 5, 10, 15 or 20 MHz to provide a downlink or uplink transmission service to several UEs. Different cells may be set to provide different bandwidths.

Downlink transport channels for transmission of data from the network to the UE include a broadcast channel (BCH) for transmission of system information, a paging channel (PCH) for transmission of paging messages, and a downlink shared channel (SCH) for transmission of user traffic or control messages. Traffic or control messages of a downlink multicast or broadcast service may be transmitted through a downlink SCH and may also be transmitted through a downlink multicast channel (MCH). Uplink transport channels for transmission of data from the UE to the network include a random access channel (RACH) for transmission of initial control messages and an uplink SCH for transmission of user traffic or control messages. Logical channels, which are located above the transport channels and are mapped to the transport channels, include a broadcast control channel (BCCH), a paging control channel (PCCH), a common control channel (CCCH), a multicast control channel (MCCH), and a multicast traffic channel (MTCH).

Figure 3:
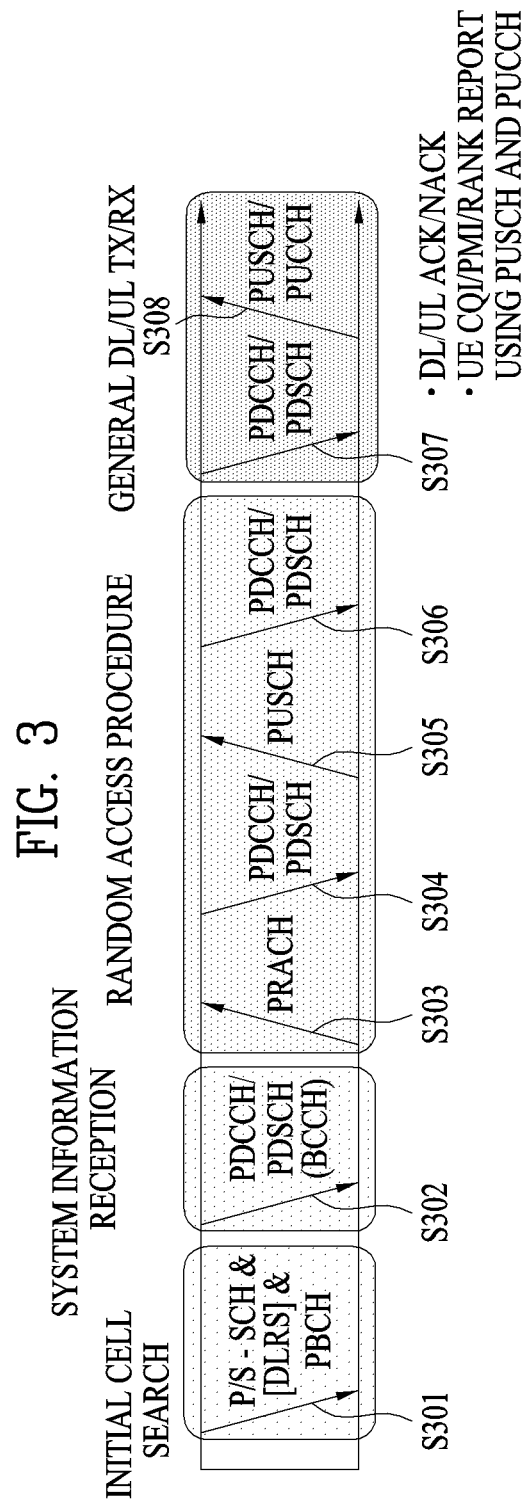
FIG. 3 is a diagram showing physical channels used in a 3GPP system and a general signal transmission method using the same.

FIG. 3 is a diagram showing physical channels used in a 3GPP system and a general signal transmission method using the same.

A UE performs an initial cell search operation such as synchronization with an eNB when power is turned on or the UE enters a new cell (S301). To this end, the UE may receive a Primary synchronization channel (P-SCH) and a secondary synchronization channel (S-SCH) from the eNB, perform synchronization with the eNB, and acquire information such as a cell ID. Thereafter, the UE may receive a physical broadcast channel from the eNB so as to acquire broadcast information within the cell. Meanwhile, the UE may receive a Downlink Reference Signal (DL RS) so as to confirm a downlink channel state in the initial cell search step.

The UE which completes the initial cell search may receive a Physical Downlink Control Channel (PDCCH) and a Physical Downlink Shared Channel (PDSCH) according to information included in the PDCCH so as to acquire more detailed system information (S302).

Meanwhile, if the eNB is initially accessed or radio resources for signal transmission are not present, the UE may perform a Random Access Procedure (RACH) (step S303 to S306) with respect to the eNB. To this end, the UE may transmit a specific sequence through a Physical Random Access Channel (PRACH) as a preamble (S303 and S305), and receive a response message of the preamble through the PDCCH and the PDSCH corresponding thereto (S304 and S306). In the case of contention-based RACH, a contention resolution procedure may be further performed.

The UE which performs the above procedures may perform PDCCH/PDSCH reception (S307) and physical uplink shared channel (PUSCH)/physical uplink control channel (PUCCH) transmission (S308) as a general uplink/downlink signal transmission procedure. In particular, the UE receives downlink control information (DCI) through the PDCCH. Here, the DCI contains control information such as resource allocation information about a UE and has different formats according to according to different usages of DCI.

The control information transmitted from the UE to the eNB in uplink or transmitted from the eNB to the UE in downlink includes a downlink/uplink ACK/NACK signal, a channel quality indicator (CQI), a precoding matrix index (PMI), a rank indicator (RI), and the like. In the case of the 3GPP LTE system, the UE may transmit the control information such as CQI/PMI/RI through the PUSCH and/or the PUCCH.

Figure 4:
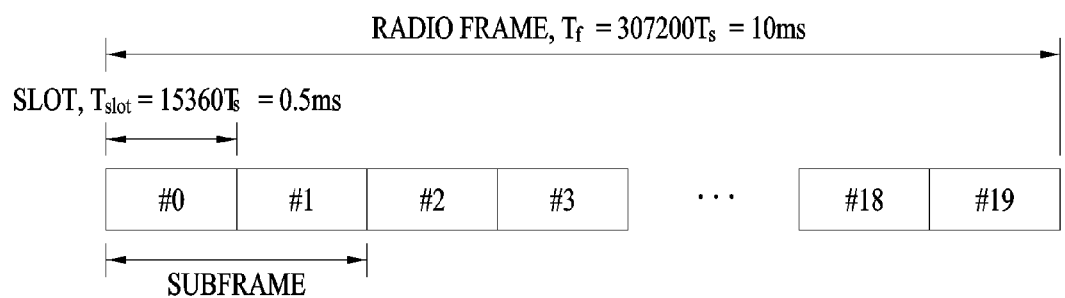
FIG. 4 is a diagram illustrating an example of the structure of a radio frame used in a long term evolution (LTE) system.

FIG. 4 is a diagram illustrating an example of the structure of a radio frame used in an LTE system.

Referring to FIG. 4, a radio frame has a length of 10 ms (327200×Ts) and includes ten subframes having an equal size. Each subframe has a length of 1 ms and includes two slots each having a length of 0.5 ms (15360×Ts). Here, Ts denotes a sampling time, which is represented as Tx=1/(15 kHz×2048)=3.2552×10−8 (approximately 33 ns). A slot includes a plurality of orthogonal frequency division multiplexing (OFDM) symbols in the time domain and a plurality of resource blocks in the frequency domain. In the LTE system, one resource block includes 12 subcarriers×7(6) OFDM symbols. A unit time for transmitting data, transmission time interval (TTI), may be set to one or more subframes. The above-described radio frame structure is exemplary and the number of subframes included in the radio frame, the number of slots included in one subframe, and the number of OFDM symbols or SC-FDMA symbols included in each slot may be changed in various manners.

Figure 5:
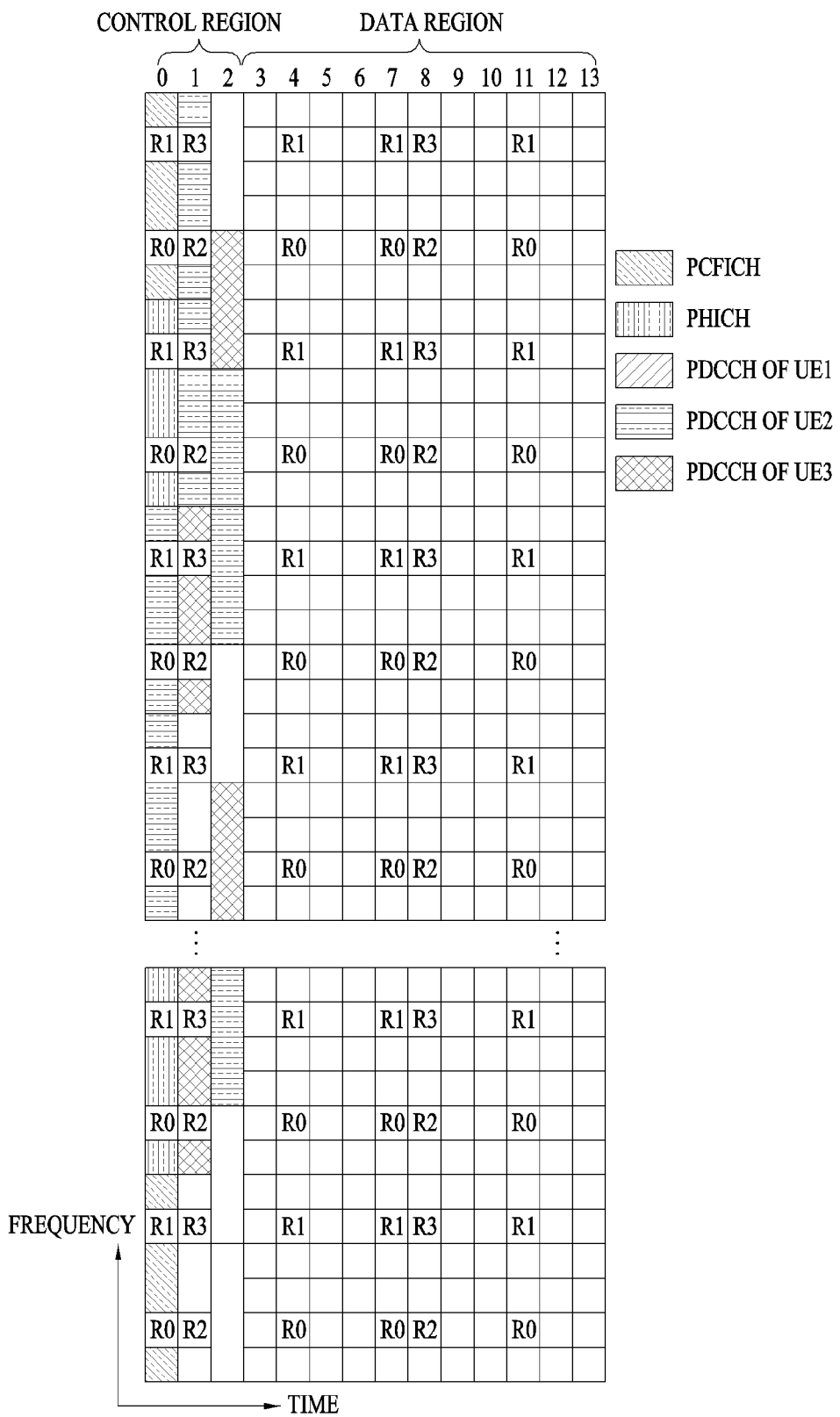
FIG. 5 is a diagram illustrating a control channel included in a control region of a subframe in a downlink radio frame.

FIG. 5 is a diagram illustrating a control channel included in a control region of a subframe in a downlink radio frame.

Referring to FIG. 5, a subframe includes 14 OFDM symbols. The first to third OFDM symbols are used as a control region and the remaining 13 to 11 OFDM symbols are used as a data region, according to subframe settings. In FIG. 5, R1 to R4 denote reference signals (RS) or pilot signals for antennas 0 to 3. The RS is fixed to a constant pattern within a subframe regardless of the control region and the data region. A control channel is allocated to resources, to which the RS is not allocated, in the control region, and a traffic channel is also allocated to resources, to which the RS is not allocated, in the control region. Examples of the control channel allocated to the control region include a physical control format indicator channel (PCFICH), physical hybrid-arq indicator channel (PHICH), physical downlink control channel (PDCCH), etc.

The physical control format indicator channel (PCFICH) informs the UE of the number of OFDM symbols used for the PDCCH per subframe. The PCFICH is located at a first OFDM symbol and is set prior to the PHICH and the PDCCH. The PCFICH includes four resource element groups (REGs) and the REGs are dispersed in the control region based on a cell identity (ID). One REG includes four resource elements (REs). An RE indicates a minimum physical resource defined as one subcarrier×one OFDM symbol. The PCFICH has a value of 1 to 3 or 2 to 4 and is modulated using a quadrature phase shift keying (QPSK) scheme.

The physical Hybrid-ARQ indicator channel (PHICH) is used to transmit HARQ ACK/NACK for uplink transmission. That is, the PHICH refers to a channel in which DL ACK/NACK information for UL HARQ is transmitted. The PHICH includes one REG and is scrambled on a cell-specific basis. ACK/NACK is indicated by one bit and is modulated using binary phase shift keying (BPSK). The modulated ACK/NACK is spread with a spreading factor (SF) of 2 or 4. A plurality of PHICHs mapped to the same resource constitutes a PHICH group. The number of multiplexed PHICHs in the PHICH group is determined according to the number of SFs. The PHICH (group) is repeated through times in order to acquire diversity gain in the frequency domain and/or time domain.

The physical downlink control channel (PDCCH) is allocated to the first n OFDM symbols of a subframe. Here, n is an integer of 1 or more and is indicated by a PCFICH. The PDCCH includes one or more control channel elements (CCEs). The PDCCH informs each UE or a UE group of information associated with resource allocation of a paging channel (PCH) and a downlink-shared channel (DL-SCH), both of which are transport channels, uplink scheduling grant, HARQ information, etc. The paging channel (PCH) and the downlink-shared channel (DL-SCH) are transmitted through a PDSCH. Accordingly, the eNB and the UE transmit and receive data through the PDSCH except for specific control information or specific service data.

Information indicating to which UE (one or a plurality of UEs) data of the PDSCH is transmitted and information indicating how the UEs receive and decode the PDSCH data is transmitted in a state of being included in the PDCCH. For example, it is assumed that a specific PDCCH is CRC-masked with a Radio Network Temporary Identity (RNTI) "A", and information about data transmitted using radio resource (e.g., frequency location) "B" and transmission format information (e.g., transmission block size, modulation scheme, coding information, or the like) "C" is transmitted via a specific subframe. In this case, one or more UEs located within a cell monitor a PDCCH using its own RNTI information, and if one or more UEs having "A" RNTI are present, the UEs receive the PDCCH and receive the PDSCH indicated by "B" and "C" through the information about the received PDCCH.

Figure 6:
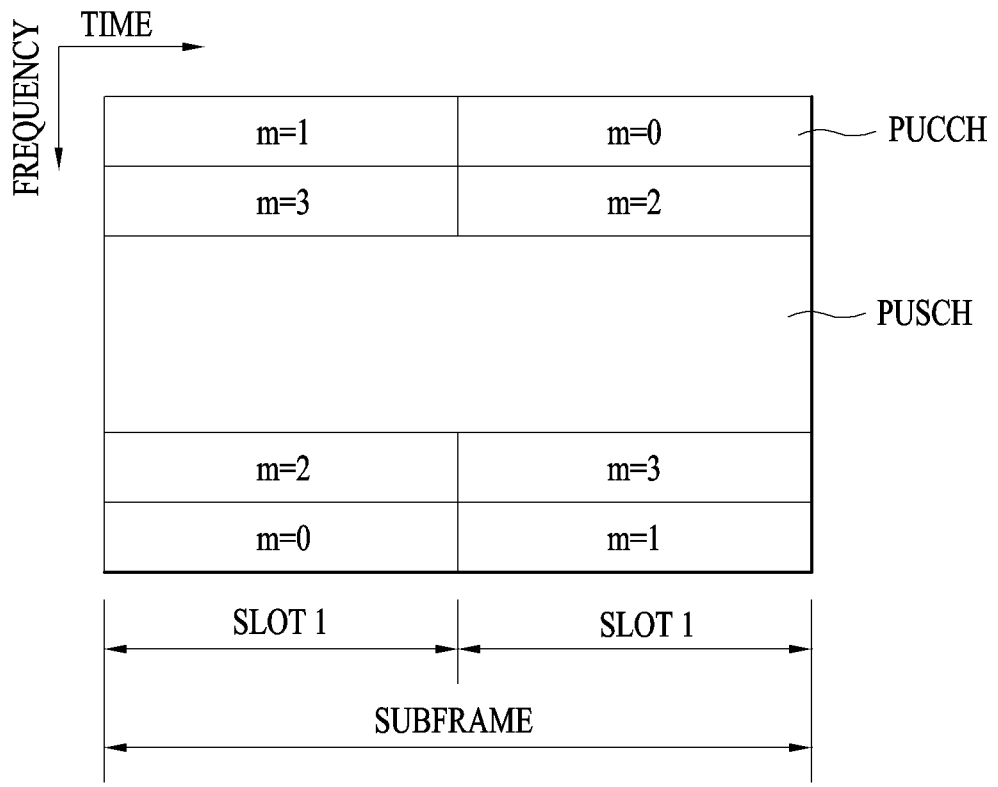
FIG. 6 is a diagram illustrating an uplink subframe structure used in an LTE system.

FIG. 6 is a diagram illustrating an uplink subframe structure used in an LTE system.

Referring to FIG. 6, a UL subframe may be divided into a region to which physical uplink control channel (PUCCH) for carrying control information is allocated and a region to which physical uplink shared channel (PUSCH) for carrying user data is allocated. The middle of the subframe is allocated to the PUSCH, while both sides of the data region in the frequency domain are allocated to the PUCCH. Control information transmitted on the PUCCH may include a Hybrid Automatic Repeat request acknowledgement/negative acknowledgement (HARQ ARCK/NACK), a Channel Quality Indicator (CQI) representing a downlink channel state, a rank indicator (RI) for multiple input multiple output (MIMO), a scheduling request (SR) requesting uplink resource allocation. A PUCCH for one UE uses one resource block that occupies different frequencies in slots in a subframe. That is, two resource blocks allocated to the PUCCH is frequency hopped at a slot boundary. In particular, PUCCHs with m=0, m=1, and m=2 are allocated to a subframe in FIG. 6.

Multiple Input Multiple Output (MIMO) System

Now a description will be given of a Multiple Input Multiple Output (MIMO) system. MIMO can increase the transmission and reception efficiency of data by using a plurality of transmission (Tx) antennas and a plurality of reception (Rx) antennas. That is, with the use of multiple antennas at a transmitter or a receiver, MIMO can increase capacity and improve performance in a wireless communication system. The term "MIMO" is interchangeable with "multi-antenna".

The MIMO technology does not depend on a single antenna path to receive a whole message. Rather, it completes the message by combining data fragments received through a plurality of antennas. MIMO can increase data rate within a cell area of a predetermined size or extend system coverage at a given data rate. In addition, MIMO can find its use in a wide range including mobile terminals, relays, etc. MIMO can overcome a limited transmission capacity encountered with the conventional single-antenna technology in mobile communication.

Figure 7:
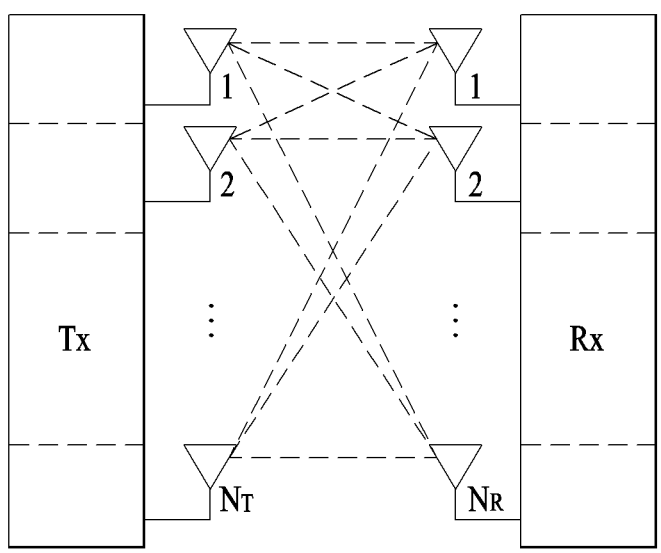
FIG. 7 illustrates the configuration of a typical multiple input multiple output (MIMO) communication system.

FIG. 7 illustrates the configuration of a typical MIMO communication system. Referring to FIG. 7, a transmitter has NT Tx antennas and a receiver has NR Rx antennas. The simultaneous use of a plurality of antennas at both the transmitter and the receiver increases a theoretical channel transmission capacity, compared to use of a plurality of antennas at only one of the transmitter and the receiver. The channel transmission capacity increases in proportion to the number of antennas. Therefore, transmission rate and frequency efficiency are increased. Given a maximum transmission rate Ro that may be achieved with a single antenna, the transmission rate may be increased, in theory, to the product of Ro and a transmission rate increase rate Ri in the case of multiple antennas. Ri is the smaller value between NT and NR.

$$R_i = \min(N_T, N_R) \quad \text{[Equation 1]}$$

For instance, a MIMO communication system with four Tx antennas and four Rx antennas may achieve a four-fold increase in transmission rate theoretically, relative to a single-antenna system. Since the theoretical capacity increase of the MIMO system was verified in the middle 1990s, many techniques have been actively proposed to increase data rate in real implementation. Some of the techniques have already been reflected in various wireless communication standards for 3G mobile communications, future-generation wireless local area network (WLAN), etc.

Concerning the research trend of MIMO up to now, active studies are underway in many respects of MIMO, inclusive of studies of information theory related to calculation of multi-antenna communication capacity in diverse channel environments and multiple access environments, studies of measuring MIMO radio channels and MIMO modeling, studies of time-space signal processing techniques to increase transmission reliability and transmission rate, etc.

Communication in a MIMO system with NT Tx antennas and NR Rx antennas as illustrated in FIG. 7 will be described in detail through mathematical modeling. Regarding a transmission signal, up to NT pieces of information can be transmitted through the NT Tx antennas, as expressed as the vector shown in Equation 2 below.

$$s = [s_1, s_2, \ldots, s_{N_T}]^T \quad \text{[Equation 2]}$$

A different transmission power may be applied to each piece of transmission information, $s_1, s_2, \ldots, s_{N_T}$. Let the transmission power levels of the transmission information be denoted by $P_1, P_2, \ldots, P_{N_T}$, respectively. Then the transmission power-controlled transmission information vector is given as $$\hat{s} = [\hat{s}_1, \hat{s}_2, \ldots, \hat{s}_{N_T}]^T = [P_1 s_1, P_2 s_2, \ldots, P_{N_T} s_{N_T}]^T \quad \text{[Equation 3]}$$

The transmission power-controlled transmission information vector $\hat{s}$ may be expressed as follows, using a diagonal matrix P of transmission power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Equation 4]}$$

NT transmission signals $x_1, x_2, \ldots, x_{N_T}$ may be generated by multiplying the transmission power-controlled information vector $\hat{s}$ by a weight matrix W. The weight matrix W functions to appropriately distribute the transmission information to the Tx antennas according to transmission channel states, etc. These NT transmission signals $x_1, x_2, \ldots, x_{N_T}$ are represented as a vector x, which may be determined by Equation 5 below. Herein, $w_{ij}$ denotes a weight between a jth piece of information and an ith Tx antenna and W is referred to as a weight matrix or a precoding matrix.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \ldots & w_{1N_T} \\ w_{21} & w_{22} & \ldots & w_{2N_T} \\ \vdots & & \ddots & \\ w_{i1} & w_{i2} & \ldots & w_{iN_T} \\ \vdots & & \ddots & \\ w_{N_T 1} & w_{N_T 2} & \ldots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = W\hat{s} = WPs \quad \text{[Equation 5]}$$

In general, the rank of a channel matrix is the maximum number of different pieces of information that can be transmitted on a given channel, in its physical meaning. Therefore, the rank of a channel matrix is defined as the smaller between the number of independent rows and the number of independent columns in the channel matrix. The rank of the channel matrix is not larger than the number of rows or columns of the channel matrix. The rank of a channel matrix H, rank(H) satisfies the following constraint.

$$\text{rank}(H) \leq \min(N_T, N_R) \quad \text{[Equation 6]}$$

A different piece of information transmitted in MIMO is referred to as 'transmission stream' or shortly 'stream'. The 'stream' may also be called 'layer'. It is thus concluded that the number of transmission streams is not larger than the rank of channels, i.e. the maximum number of different pieces of transmittable information. Thus, the channel matrix H is determined by $$\text{\# of streams} \leq \text{rank}(H) \leq \min(N_T, N_R) \quad \text{[Equation 7]}$$

"#of streams" denotes the number of streams. One thing to be noted herein is that one stream may be transmitted through one or more antennas.

One or more streams may be mapped to a plurality of antennas in many ways. The stream-to-antenna mapping may be described as follows depending on MIMO schemes. If one stream is transmitted through a plurality of antennas, this may be regarded as spatial diversity. When a plurality of streams is transmitted through a plurality of antennas, this may be spatial multiplexing. Needless to say, a hybrid scheme of spatial diversity and spatial multiplexing in combination may be contemplated.

Channel State Information (CSI) Feedback

Channel State Information (CSI) reporting will be described below. In the current LTE standard, there are two MIMO transmission schemes, open-loop MIMO operating without channel information and closed-loop MIMO operating with channel information. Particularly in the closed-loop MIMO, each of an eNB and a UE may perform beamforming based on CSI to obtain the multiplexing gain of MIMO Tx antennas. To acquire CSI from the UE, the eNB may transmit a reference signal (RS) to the UE and may command the UE to feed back measured CSI on a PUCCH or PUSCH.

CSI is classified largely into three information types, R1, PMI, and CQI. An RI is information about a channel rank, as described before. The channel rank is the number of streams that a UE can receive in the same time-frequency resources. Because the RI is determined mainly according to the long-term fading of a channel, the RI may be fed back to an eNB in a longer period than a PMI and a CQI.

A PMI is the index of a UE-preferred eNB precoding matrix determined based on a metric such as signal to interference and noise ratio (SINR), reflecting the spatial characteristics of channels. A CQI represents a channel strength. In general, the CQI reflects a reception SINR that the eNB can achieve with a PMI.

An advanced system such as an LTE-A system considers achievement of an additional multi-user diversity by the use of Multi-User MIMO (MU-MIMO). Due to the existence of interference channels between UEs multiplexed in an antenna domain in MU-MIMO, the accuracy of CSI may significantly affect interference with other multiplexed UEs as well as a UE that reports the CSI. Accordingly, more accurate CSI than in Single User MIMO (SU-MIMO) should be reported in MU-MIMO.

In this context, the LTE-A standard designs a final PMI separately as a long-term and/or wideband PMI, W1 and a short-term and/or subband PMI, W2.

For example, the long-term covariance matrix of channels expressed as Equation 8 below may be used for hierarchical codebook transformation that configures one final PMI with W1 and W2.

$$W = \text{norm}(W1 W2) \quad \text{[Equation 8]}$$

In Equation 8 above, W2 is a short-term PMI, which is a codeword of a codebook reflecting short-term channel information, W is a codeword of a final codebook, and norm(A) is a matrix obtained by normalizing the norm of each column of matrix A to 1.

Conventionally, the codewords W1 and W2 are given as Equation 9 below.

$$W1(i) = \begin{bmatrix} X_i & 0 \\ 0 & X_i \end{bmatrix}, \text{ where } X_i \text{ is } Nt/2 \text{ by } M \text{ matrix.} \quad \text{[Equation 9]}$$

-continued $$W2(j) = \begin{bmatrix} \overbrace{e_M^k \quad e_M^l \quad \cdots \quad e_M^m}^{r columns} \\ \alpha_j e_M^k \quad \beta_j e_M^l \quad \cdots \quad \gamma_j e_M^m \end{bmatrix}$$

(if rank = $r$), where $1 \le k, l, m \le M$
and $k, l, m$ are integer.

Here, Nt is the number of Tx antennas and M is the number of columns of a matrix Xi, which means that the matrix Xi has total M candidate column vectors. $e_M^k$, $e_M^l$, and $e_M^m$ are column vectors that have elements of 0 except for only kth, lth, and mth elements that are 1 among M elements and are kth, lth, and mth column vectors of Xi. $\alpha_j$, $\beta_j$, and $\gamma_j$ are complex values and indicate that phase rotation is applied to the kth, lth, and mth column vectors of the matrix in order to choose these column vectors, respectively. i is an integer equal to or greater than 0 and is a PMI index indicating W1. j is an integer equal to or greater than 0 and is a PMI index indicating W2.

In Equation 9 above, the codewords are designed so as to reflect correlation characteristics between established channels, if cross polarized antennas are arranged densely, for example, the distance between adjacent antennas is equal to or less than a half of a signal wavelength. The cross polarized antennas may be divided into a horizontal antenna group and a vertical antenna group and the two antenna groups are co-located, each having the property of a uniform linear array (ULA) antenna.

Therefore, the correlations between antennas in each group have the same linear phase increment property and the correlation between the antenna groups is characterized by phase rotation. Since a codebook is eventually quantized values of channels, it is necessary to design a codebook, reflecting channel characteristics. For the convenience of description, a rank-1 codeword designed in the above manner may be given as Equation 10 below.

$$W1(i) * W2(j) = \begin{bmatrix} X_i(k) \\ \alpha_j X_i(k) \end{bmatrix} \quad \text{[Equation 10]}$$

In [Equation 10], a codeword is expressed as an $N_T \times 1$ vector where NT is the number of Tx antennas and the codeword is composed of an upper vector $X_i(k)$ and a lower vector $\alpha_j X_i(k)$, representing the correlation characteristics of the horizontal and vertical antenna groups, respectively. Preferably, $X_i(k)$ is expressed as a vector having the linear phase increment property, reflecting the correlation characteristics between antennas in each antenna group. For example, a Discrete Fourier Transform (DFT) matrix may be used for $X_i(k)$.

As described above, CSI in an LTE system includes, but is not limited to, CQI, PMI, and RI. Some or all of CQI, PMI, and RI may be transmitted according to a transmission mode of a UE. A case in which CSI is periodically transmitted is referred to as periodic reporting and a case in which CSI is transmitted according to request of a BS is referred to as aperiodic reporting. In case of aperiodic reporting, a request bit contained in UL scheduling information from the BS is transmitted to the UE. Then, the UE transmits CSI obtained in consideration of a transmission mode of the UE to the BS via a UL data channel (PUSCH). In case of periodic reporting, periods, offset for a corresponding period, etc. are signaled in units of subframes via an upper layer signal for each respective UE in a semi-static manner. Each UE transmits CSI obtained in consideration of a transmission mode of the UE to the BS via a UL control channel (PUCCH) according to a predetermined period. When UL data and CSI are simultaneously present in a subframe for transmitting CSI, the CSI is transmitted through a UL data channel (PUSCH) together with the data. The BS transmits transmission timing information appropriate for each respective UE to the UE in consideration of a channel state of each UE, a distribution state of UEs in a cell, etc. The transmission timing information includes a period, offset, etc. for transmission of CSI and may be transmitted to each UE through an RRC message.

FIGS. 8 to 11 illustrate periodic reporting of CSI in LTE.

Figures 8, 9:
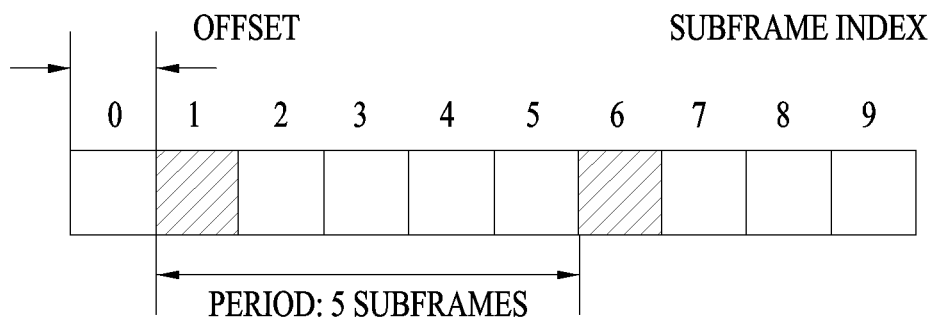
FIGS. 8 to 11 illustrate periodic reporting of channel state information (CSI)

Referring to FIG. 8, an LTE system has four CQI reporting modes. In detail, the CQI reporting mode is classified into WB CQI and SB CQI according to a CQI feedback type and is classified into no PMI and single PMI according to whether PMI is transmitted. Each UE receives information formed by combining a period and offset via RRC signaling in order to periodically report CQI.

FIG. 9 illustrates an example in which a UE transmits CSI when information indicating {period '5' and offset '1'} is signaled to the UE. Referring to FIG. 9, upon receiving the information indicating {period '5' and offset '1'}, the UE transmits CSI in units of 5 subframes with an offset of one subframe in a direction in which a subframe index increases from a 0th subframe. CSI. CSI is basically transmitted via a PUCCH. However, when PUSCH for transmission is present at the same time, CSI is transmitted together with data via PUSCH. A subframe index is formed by combining a system frame number (or a radio frame index)(nf) and a slot index (ns, 0 to 19). Since a subframe includes 2 slots, a subframe index may be defined according to 10*nf+floor (ns/2). floor( ) indicates a rounddown function.

There are a type for transmitting only WB CQI and a type for both WB CQI and SB CQI. In case of the type for transmitting only WB CQI, CQI information about an entire band in a subframe corresponding to every CQI transmission period is transmitted. As illustrated in FIG. 8, when PMI needs to be also transmitted according to a PMI feedback type, PMI information is transmitted together with CQI information. In case of the type for transmitting both WB CQI and SB CQI, WB CQI and SB CQI are alternately transmitted.

Figure 10:
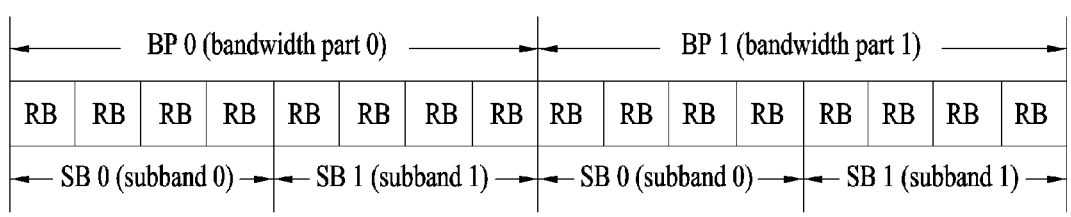
Figure 11:
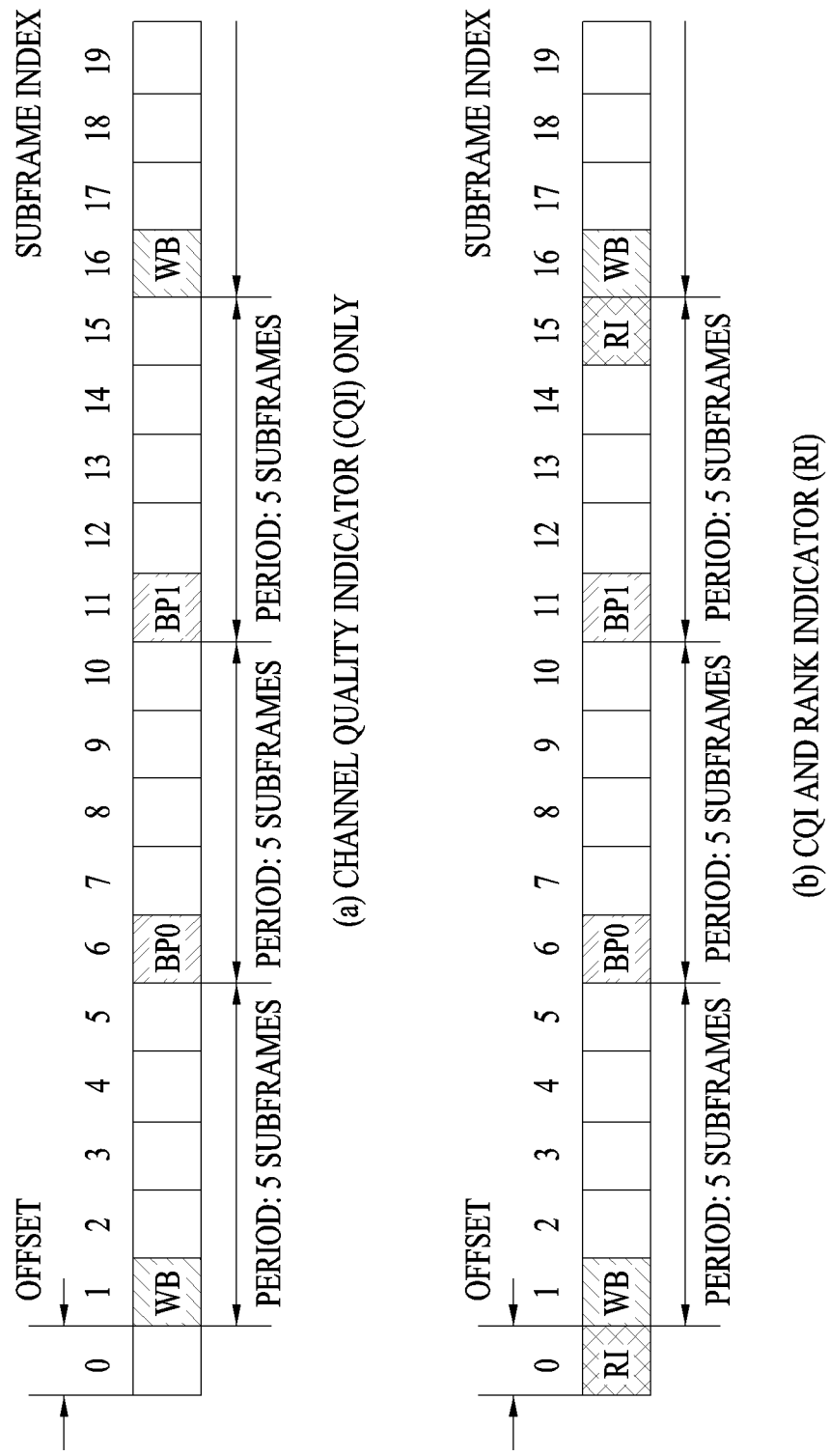

FIG. 10 is a diagram illustrating an exemplary system having a system band with 16 RBs. In this case, it is assumed that the system band includes two bandwidth parts (BPs) BP0 and BP1 which each include two subbands SB0 and SB1 which each include four RBs. This assumption is purely exemplary for explanation. The number BPs and the size of each SB may vary according to the size of the system band. In addition, the number of SBs included in each BP may vary according to the number of RBs, the number of BPs, and the size of SB.

In case of the type for transmission both WB CQI and SB CQI, WB CQI is transmitted in a first CQI transmission subframe, and CQI about an SB having a better channel state from SB0 and SB1, belonging to BP0, and an index (e.g., a subband selection indicator (SSI) corresponding to the corresponding SB are transmitted in a next CQI transmission subframe. Then, CQI about an SB having a better channel state from SB0 and SB1, belonging to BP1, and an index corresponding to the corresponding SB is transmitted in a next transmission subframe. Likewise, after WB CQI is transmitted, CQI information about BPs is sequentially transmitted. CQI information about each BP between two WB CQIs may be sequentially transmitted once to four times. For example, when CQI information about each BP between two WB CQIs is sequentially transmitted once, CQI information may be transmitted in an order of WB CQI⇒BP0 CQI⇒BP1 CQI⇒WB CQI. In addition, when CQI information about each BP between two WB CQIs is sequentially transmitted four times, CQI information may be transmitted in an order of WB CQI⇒BP0 CQI⇒BP1 CQI⇒BP0 CQI⇒BP1 CQI⇒BP0 CQI⇒BP1 CQI⇒BP0 CQI⇒BP1 CQI⇒WB CQI. Information about a number of times that each BP CQI is sequentially transmitted is signaled in an upper layer (e.g., an RRC layer).

FIG. 11(a) is a diagram illustrating an example in which a UE transmits both WB CQI and SB CQI when information indicating {period '5' and offset '1'} is signaled to the UE. Referring to FIG. 11(a), CQI may be transmitted in only a subframe corresponding to signaled period and offset irrespective a type of CQI. FIG. 11(b) illustrates a case in which RI is additionally transmitted in a case of FIG. 11(a). RI may be signaled from an upper layer (e.g., an RRC layer) via a combination of a multiple of WB CQI transmission period and offset in the corresponding transmission period. Offset of RI is signaled as a relative value based on offset of CQI. For example, when the offset of CQI is '1' and the offset of RI is '0', RI may have the same offset as CQI. The offset of RI is defined as 0 and a negative value. In detail, FIG. 11(b) assumes a case in which a RI transmission period is one time of a WB CQI transmission period and the offset of RI is '−1' in the same environment as in FIG. 11(a). Since the RI transmission period is one time of the WB CQI transmission period, transmission periods of CSI are actually the same. Since the offset of RI is '−1', RI is transmitted based on '−1' (that is, subframe #0) with respect to offset '1' of CQI in FIG. 11(a). When the offset of RI is '0', transmission subframes of WB CQI and RI overlap each other. In this case, WB CQI is dropped and RI is transmitted.

Figure 12:
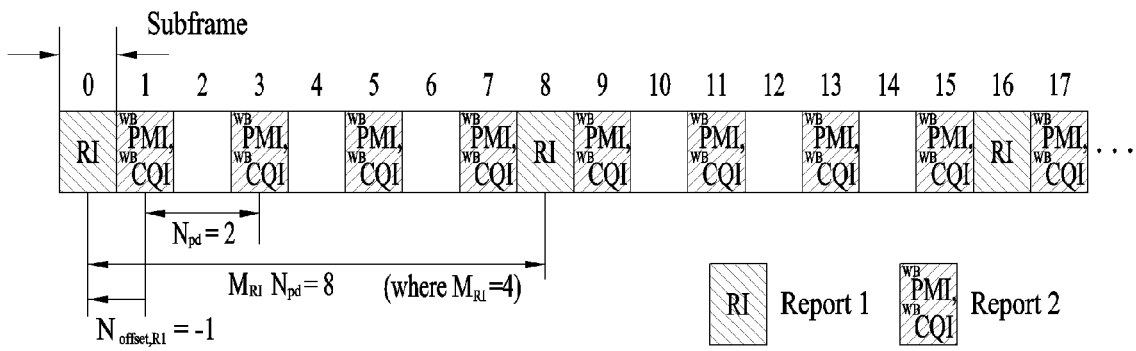
FIGS. 12 and 13 illustrate an exemplary process for periodically reporting CSI when a non-hierarchical codebook is used.

FIG. 12 is a diagram illustrating CSI feedback in case of Mode 1-1 of FIG. 8.

Referring to FIG. 12, the CSI feedback is composed of transmission of two types of report contents, Report 1 and Report 2. In detail, RI is transmitted in Report 1 and WB PMI and WB CQI are transmitted in Report 2. Report 2 is transmitted in a subframe with a subframe index satisfying $(10*nf+floor(ns/2)-N$ offset, $CQI) mod(Npd)=0$. N offset, CQI corresponds to an offset value for transmission of PMI/CQI illustrated in FIG. 9. FIG. 12 illustrates a case of N offset, CQI=1. Npd 5 is a subframe interval between adjacent Reports 2. FIG. 12 illustrates a case of Npd=2. Report 1 is transmitted in a subframe with a subframe index satisfying $(10*nf+floor(ns/2)-N$ offset, CQI-N offset, $RI) mod(MRI*Npd)=0$. MRI is determined via higher-layer signaling. In addition, N offset, RI corresponds to a relative offset value for transmission of RI illustrated in FIG. 11. FIG. 12 illustrates a case of MRI=4 and N offset, RI=−1.

Figure 13:
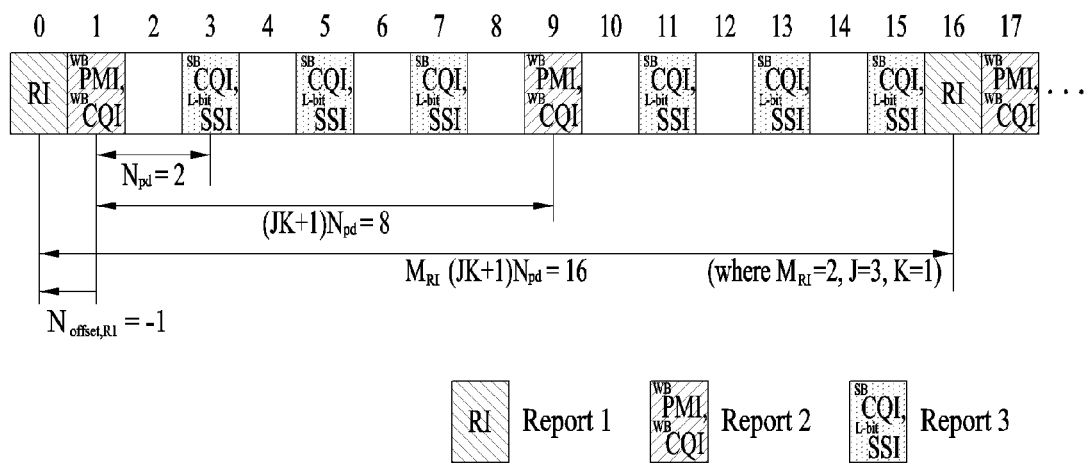

FIG. 13 is a diagram illustrating CSI feedback in case of Mode 2-1 illustrated in FIG. 8.

Referring to FIG. 13, the CSI feedback is composed of transmission of three types of report contents, Report 1, Report 2, and Report 3. In detail, RI is transmitted in Report 1, WB PMI and WB CQI are transmitted in Report 2, and subband (SB) CQI and L-bit subband selection indicator (SSI) are transmitted in Report 3. Report 2 or Report 3 is transmitted in a subframe with a subframe index satisfying $(10*nf+floor(ns/2)-N$ offset, $CQI) mod(Npd)=0$. In particular, Report 2 is transmitted in a subframe with a subframe index satisfying $(10*nf+floor(ns/2)-N$ offset, $CQI) mod(H*Npd)=0$. Thus, Report 2 is transmitted every interval of H*Npd and subframes between adjacent Reports 2 are filled by transmitting Report 3. In this case, H satisfies H=J*K+1, where J is the number of bandwidth parts (BPs). K indicates the number of continuously-performed full cycles for selecting a subband for each of different BPs once and transmitting subbands over all BPs and is determined via higher-layer signaling. FIG. 13 illustrates a case of Npd=2, J=3, and K=1. Report 1 is transmitted in a subframe with a subframe index satisfying $(10*nf+floor(ns/2)-N$ offset, CQI-N offset, $RI) mod(MRI*(J*K+1)*Npd)=0$. FIG. 13 illustrates a case of MRI=2 and N offset, RI=−1.

Figure 15:
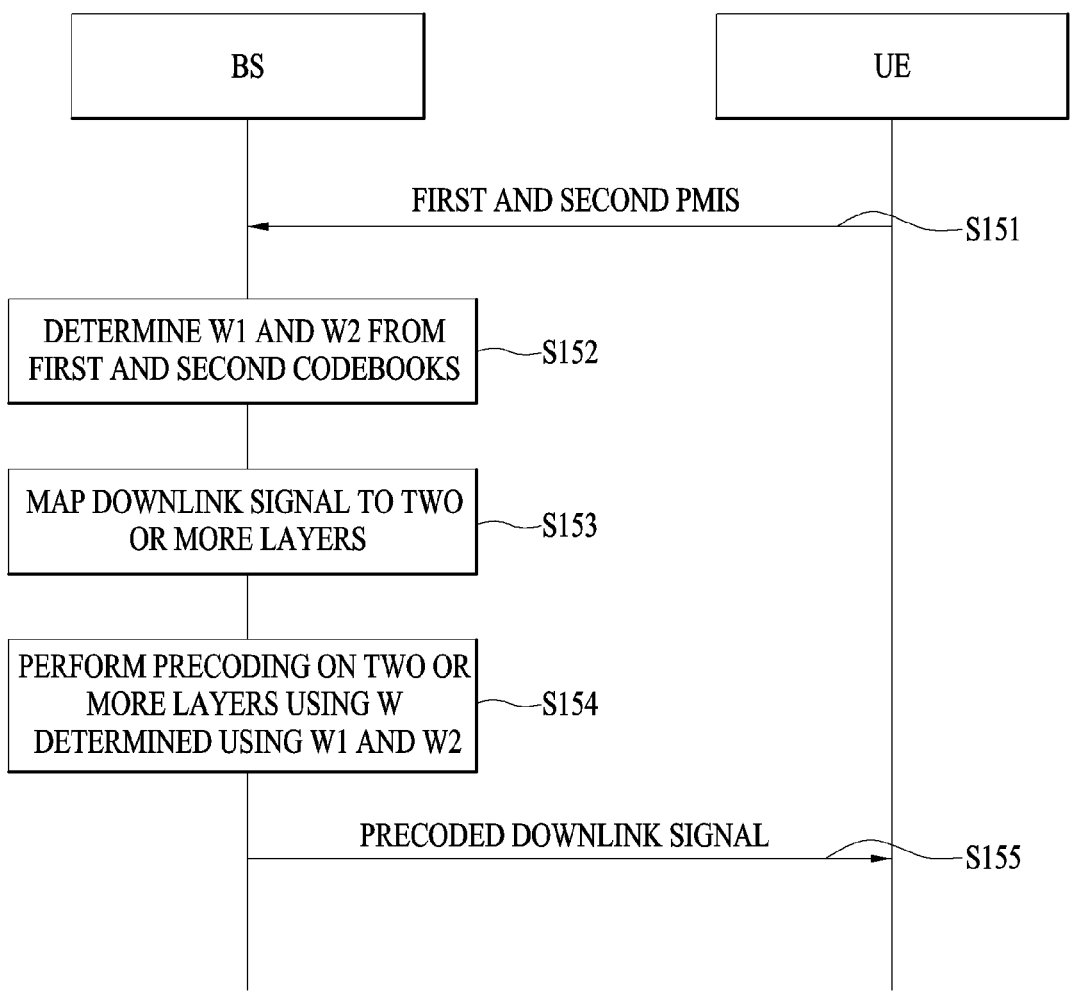
FIG. 15 is a flowchart of a multiple antenna transmitting and receiving method according to the present invention.

FIG. 14 is a diagram illustrating periodic reporting of CSI that has been discussed in an LTE-A system. When BS has 8 Tx antennas, in case of Mode 2-1, a precoder type indication (PTI) parameter as a 1-bit indicator is set, and a periodic reporting mode subdivided into two types according to a PTI value is considered, as illustrated in FIG. 15. In FIG. 14, W1 and W2 indicate hierarchical codebook described with reference to Equations 8 and 9 above. When both W1 and W2 are determined, precoding matrix W completed by combining W1 and W2 is determined.

Referring to FIG. 14, In case of periodic reporting, different contents corresponding to Report 1, Report 2, and Report 3 are reported according to different reiteration periods. RI and 1-bit PTI are reported in Report 1. WB (WideBand) W1 (when PTI=0) or WB W2 and WB CQI (when PTI=1) are reported in Report 2. WB W2 and WB CQI (when PTI=0) or subband (SB) W2 and SB CQI (when PTI=1) are reported in Report 3.

Report 2 and Report 3 are transmitted in a subframe (for convenience, referred to as a first subframe set) with a subframe index satisfying $(10*nf+floor(ns/2)-N$ offset, CQI) mod (NC)=0. N offset, CQI corresponds to an offset value for transmission of PMI/CQI illustrated in FIG. 9. In addition, Nc indicates a subframe interval between adjacent Reports 2 or Reports 3. FIG. 14 illustrates an example in which N offset, CQI=1 and Nc=2. The first subframe set is composed of subframes with an odd index. nf indicates a system frame number (or a radio frame index) and ns indicates a slot index in a radio frame. floor( ) indicates a rounddown function, and A mod B indicates a remainder obtained by dividing A by B.

Report 2 is located in some subframes in the first subframe set and Report 3 is located in the remaining subframes. In detail, Report 2 is located in a subframe with a subframe index satisfying $(10*nf+floor(ns/2)-N$ offset, CQI) mod (H*Nc)=0. Accordingly, Report 2 is transmitted every interval of H*Nc, and one or more first subframes between adjacent Reports 2 are filled by transmitting Report 3. In case of PTI=0, H=M and M is determined via higher-layer signaling. FIG. 14 illustrates a case of M=2. In case of PTI=1, H=J*K+1, K is determined via higher-layer signaling, and J is the number of BPs. FIG. 14 illustrates a case of J=3 and K=1.

Report 1 is transmitted in a subframe with a subframe index satisfying $(10*nf+floor(ns/2)-N$ offset, CQI-N offset, RI) mod (MRI*(J*K+1)*Nc)=0, and MRI is determined via higher-layer signaling. N offset, RI corresponds to a relative offset value for RI. FIG. 14 illustrates a case of MRI=2 and N offset, RI=−1. According to N offset, RI=−1, transmission time for Report 1 and transmission time for Report 2 do not overlap each other. When a UE calculates R1, W1, and W2, R1, W1, and W2 are associated with each other. For example, W1 and W2 are calculated with dependence upon R1, and W2 is calculated with dependence upon W1. At a point of time when both Report 2 and Report 3 are reported after Report 1 is reported, a BS may know final W from W1 and W2.

8 Tx (Transmit Antenna) Codebook

A communication system such as LTE-A further applies multi-user diversity technology using multi-user MIMO (MU-MIMO). To this end, from a feedback point of view, more enhanced accuracy is required than before. This is because there is an interference channel between UEs that are multiplexed in an antenna domain of MU-MIMO, and thus the accuracy of a feedback channel largely affects another multiplexed UE as well as a UE that transmits feedback. Accordingly, in order to enhance feedback channel accuracy in LTE-A, a PMI of a 8Tx codebook may be designed to be divided into $W^{(1)}$ that is a long term and/or wideband precoder and $W^{(2)}$ that is a short term and/or sub-band precoder.

An equation for one final PMI from two-channel information is represented by multiplication of $W^{(1)}$ and $W^{(2)}$ as follows.

$$W = \text{norm}(W^{(1)} W^{(2)}) \quad \text{[Equation 11]}$$

In [Equation 11] above, W is a precoder generated from $W^{(1)}$ and $W^{(2)}$, and UE feedbacks the information to a BS. norm(A) refers to a matrix with a norm normalized to 1 for each column of matrix A.

Detailed configurations of $W^{(1)}$ and $W^{(2)}$ in a 8Tx codebook defined in LTE are represented as follows.

$$W1(i) = \begin{bmatrix} X_i & 0 \\ 0 & X_i \end{bmatrix}, \quad \text{[Equation 12]}$$

where $X_i$ is $Nt/2$ by $M$ matrix.

$$W2(j) = \begin{bmatrix} e_M^k & e_M^l & \cdots & e_M^m \\ \alpha_j e_M^k & \beta_j e_M^l & & \gamma_j e_M^m \end{bmatrix}^{\text{rcolumns}}$$

(if rank = r), where $1 \leq k, l, m \leq M$ and $k, l, m$ are integer.

The codewords are designed so as to reflect correlation characteristics between established channels, if cross polarized antennas are arranged densely, for example, the distance between adjacent antennas is equal to or less than a half of a signal wavelength. The cross polarized antennas may be divided into a horizontal antenna group and a vertical antenna group and the two antenna groups are co-located, each having the property of a uniform linear array (ULA) antenna. Therefore, the correlations between antennas in each group have the same linear phase increment (LPI and LPI) property and the correlation between the antenna groups is characterized by phase rotation.

Since a codebook is eventually quantized values of channels, it is necessary to design a codebook, reflecting channel characteristics corresponding to a source. For example, a rank 1 codeword satisfying [Equation 13] may reflect the aforementioned characteristics.

$$W1(i) * W2(j) = \begin{bmatrix} X_i(k) \\ \alpha_j X_i(k) \end{bmatrix} \quad \text{[Equation 13]}$$

In [Equation 13], a codeword is expressed as an $Nt \times 1$ ($N_T$ is the number of Tx antennas) and the codeword is composed of an upper vector $X_i(k)$ and a lower vector $\alpha_j X_i(k)$, representing the correlation characteristics of the horizontal and vertical antenna groups, respectively. $X_i(k)$ is expressed as a vector having the linear phase increment property, reflecting the correlation characteristics between antennas in each antenna group. For example, a Discrete Fourier Transform (DFT) matrix may be used for $X_i(k)$.

4 Tx Dual Codebook Downscaled from 8 Tx Codebook

In an LTE Rel-10 system, a 8 Tx codebook for a BS having 8 Tx antennas is defined. The above codebook is a dual codebook structure in which two codebooks are multiplied and includes $W^{(1)}$ codebook including wideband/longterm channel information and $W^{(2)}$ codebook including subband/shorter channel information. Recently, a codebook similar to the 8Tx codebook defined in the LTE Rel-10 system was proposed as one of 4Tx codebook. The proposed codebook is as follows.

The overall precoder is formed as the product of $W^{(1)}$ and $W^{(2)}$ according to [Equation 14] below.

$$W = W^{(1)} W^{(2)} \quad \text{[Equation 14]}$$

The inner precoder $W^{(1)}$ is then selected from a first codebook $C^{(1)}$ according to [Equation 15] below.

$$C^{(1)} = \left\{ \begin{bmatrix} \tilde{W}^{(1)} & 0 \\ 0 & \tilde{W}^{(1)} \end{bmatrix} \right| \quad \text{[Equation 15]}$$

$$\tilde{W}^{(1)} = [w_{2k \bmod 16} \; w_{(2k+1) \bmod 16} \; w_{(2k+2) \bmod 16} \; w_{(2k+3) \bmod 16}],$$

$$k = 0, 1, \ldots, 7 \right\}$$

where $w_n = \begin{bmatrix} 1 \\ e^{j\frac{2\pi n}{16}} \end{bmatrix}, n = 0, 1, \ldots, 15$ The outer precoder $W^{(2)}$ for rank 1 transmission is selected from a second codebook $C_1^{(2)}$ according to [Equation 16] below.

$$C_1^{(2)} = \left\{ \begin{bmatrix} Y \\ a_1 Y \end{bmatrix}, \begin{bmatrix} Y \\ -a_1 Y \end{bmatrix}, \begin{bmatrix} Y \\ ja_1 Y \end{bmatrix}, \begin{bmatrix} Y \\ -ja_1 Y \end{bmatrix} \right\} \quad \text{[Equation 16]}$$

$$Y \in \{e_1, e_2, e_3, e_4\}$$

Here, $e_n$ is a selection vector with all zeros except for an $n^{th}$ element where n is 1 to 4. In addition, $a_n = e^{j\phi_n}$ is satisfied and $\phi_n$ is a phase value determined by a codeword index of $C^{(1)}$ and $C_1^{(2)}$ and is responsible for compensation such that $$\begin{bmatrix} Y \\ a_1 Y \end{bmatrix}$$

has LPI property.

An outer precoder $W^{(2)}$ for rank 2 transmission is selected from the second codebook $C_2^{(2)}$.

$$C_2^{(2)} = \left\{ \begin{bmatrix} Y_1 & Y_2 \\ a_1 Y_1 & -a_2 Y_2 \end{bmatrix}, \begin{bmatrix} Y_1 & Y_2 \\ ja_1 Y_1 & -ja_2 Y_2 \end{bmatrix} \right\} \quad \text{[Equation 17]}$$

-continued $$(Y_1, Y_2) \in \left\{ \begin{array}{l} (e_1, e_1), (e_2, e_2), (e_3, e_3), (e_4, e_4), \\ (e_1, e_2), (e_2, e_3), (e_1, e_4), (e_2, e_4) \end{array} \right\}$$

Here, $e_n$ is a 4-element selection vector with all zeros except the $n^{th}$ element. In addition, $a_n = e^{j\Phi_n}$ is satisfied and $\phi_n$ is a phase value determined by a codeword index of $C^{(1)}$ and $C_2^{(2)}$ and is responsible for compensation such that each vector of $$\begin{bmatrix} Y_1 & Y_2 \\ a_1 Y_1 & -a_2 Y_2 \end{bmatrix}$$

has LPI property.

The rank 1 codeword of the 4Tx codebook is generated as follows. A 2×2 DFT matrix is oversampled eightfold to generate a 2×16 DFT matrix. When one of 16 vectors is selected and the selected 2×1 vector is v, v repeatedly concatenates to generate a 4×1 vector of $[v\ v]^T$. In consideration of four phase compensation values $\{1, j, -1, -j\}$ for phase compensation of a vertical antenna group and a horizontal antenna group of X-pol antennas, one of $\{[v\ a_1 v]^T, [v\ a_1 *j*v]^T, [v\ -a_1 *v]^T, [v\ -a_1 *j*v]^T\}$ is selected. If compensation is not performed using $a_1$, only eight vectors among a total of 64 rank 1 vectors have LPI property. The lower vector is multiplied by a1 to perform compensation such that codeword of $[v\ a_i v]^T$ always has LPI property. As a result, 16 vectors among a total of 64 rank 1 vectors have LPI property. $a_1$ is determined by a function of codewords of $C^{(1)}$ and $C_2^{(2)}$.

Channel Property of ULA Antenna

The channel property of the ULA antenna may be expressed by the property of a dominant eigen vector of a channel. In general, in a correlated environment in which a gap between ULA antenna ports is narrow, the dominant eigen vector has LPI property. Since transmit antenna ports are separated at the same interval, the signal of each port has regular reception delay. That is, there is a reception time difference of Δi between a signal received from a first transmit antenna and a signal received from an $i^{th}$ transmit antenna. The reception time difference appears as a phase change of a channel such that there is a phase difference of τi between the signal received from the first transmit antenna and the signal received from the $i^{th}$ transmit antenna and the channel indicates LPI property. Accordingly, in a codebook optimized in the correlated environment in which the gap between ULA antenna ports is narrow, each codeword needs to have LPI property.

4 Tx Codebook According to the Present Invention

The aforementioned 4Tx codebook includes a first codebook $C^{(1)}$ having a size of 3 bits and a second codebook $C^{(2)}$ having a size of 4 bits at each ran and thus has a size of a total of 7 bits (here, the second codebook is defined to be divided into $C_1^{(2)}$ and $C_2^{(2)}$ according to rank but, for convenience of description, the second codebook is $C^{(2)}$ irrespective of rank). Some of rank 1 codewords generated as the codebook have the LPI property in consideration of the ULA antenna. However, a codeword having LPI property is not present in both first and second columns among the rank 2 codewords generated as the codebook.

Accordingly, in rank 2 or more, the codebook is requested such that all beam vectors have LPI properties in order to improve a codebook performance in a high correlated ULA antenna. In addition, in order to minimize inter-stream interference, it is necessary to generate the codebook such that the beam vectors are orthonomal to each other. The present invention proposes a codebook having the following two properties in rank 2 or more. First, all beam vectors have LPI property. Second, all beam vectors need to be orthonomal to each other.

The present invention proposes a codeword in which all beam vectors have LPI property and orthonomal property in rank 2 or more and proposes a codebook having a codeword having such a property. The present invention includes a codebook composed of only codewords having the above properties and a codebook including codewords having the above properties.

The rank 2 codeword generated based on Equations 14 to 18 is represented according to [Equation 18] below $$\begin{bmatrix} w_n & w_m \\ a_1 w_n & -a_2 w_m \end{bmatrix}, \text{ or } \begin{bmatrix} w_n & w_m \\ ja_1 w_n & -ja_2 w_m \end{bmatrix} \quad \text{[Equation 18]}$$

Here, n and m refer to arbitrary DFT vector indices selected via $C_2^{(2)}$ and each of Wn and Wm refer one vector selected from the oversampled DFT vector $$w_k = \begin{bmatrix} 1 \\ e^{j\frac{2\pi k}{16}} \end{bmatrix}, k = 0, 1, \ldots, 15.$$

A condition of the following equation needs to be satisfied such that all beam vectors of the rank 2 codeword of [Equation 18] have orthonomal property.

$$w_n^H w_m - a_1^H a_2 w_n^H w_m = 0 \quad \text{[Equation 19]}$$

In order to satisfy the above equation, $a_1 = a_2$ or $w_n^H w_m = 0$ needs to be satisfied.

When the condition $a_1 = a_2$ is satisfied such that all beam vectors have orthonomal property, a condition required to satisfy LPI property will now be described.

Under the assumption of $a_1 = a_2 = e^{j\phi}$, [Equation 18] is summarized according to [Equation 20] below.

$$\begin{bmatrix} 1 & 1 \\ e^{j\frac{2\pi}{16}(n)} & e^{j\frac{2\pi}{16}(m)} \\ e^{j\phi} & -e^{j\phi} \\ e^{j(\frac{2\pi}{16}(n+\phi))} & -e^{j(\frac{2\pi}{16}(m+\phi))} \end{bmatrix}, \text{ or} \quad \text{[Equation 20]}$$

$$\begin{bmatrix} 1 & 1 \\ e^{j\frac{2\pi}{16}(n)} & e^{j\frac{2\pi}{16}(m)} \\ je^{j\phi} & -je^{j\phi} \\ je^{j(\frac{2\pi}{16}(n+\phi))} & -je^{j(\frac{2\pi}{16}(m+\phi))} \end{bmatrix}$$

As shown in the left of [Equation 20] above, [Equation 21] needs to be satisfied such that both two vectors have LPI property.

$$\phi = 2\frac{2\pi}{16}(n) = 2\frac{2\pi}{16}(m) + \pi \pm 2\pi \quad \text{[Equation 21]}$$

m and n that satisfy [Equation 21] above satisfy n=m±4.

However, if the existing codebook of [Equation 15] above is used, since |n−m|<4, it is impossible to generate a codeword having both orthonomal property and LPI property. Accordingly, in order to enable two vectors configuring the rank 2 codeword to have the LPI property, $C^{(1)}$ and $C_2^{(2)}$ need to be newly designed in the 4Tx codebook.

First Embodiment

According to a first embodiment of the present invention, [Equation 21] above is satisfied such that all vectors have LPI property and orthonomal property is satisfied according to $a_1=a_2$ among conditions based on [Equation 19] above.

$C^{(1)}$ and $C_2^{(2)}$ according to the first embodiment of the present invention are configured according to [Equation 22] below.

$$C^{(1)} = \left\{ \begin{bmatrix} \tilde{W}^{(1)} & 0 \\ 0 & \tilde{W}^{(1)} \end{bmatrix} \right. \\ \tilde{W}^{(1)} = [w_{4k\bmod 16} \quad w_{(4k+1)\bmod 16} \quad w_{(4k+2)\bmod 16} \quad w_{(4k+3)\bmod 16} \quad w_{(4k+4)\bmod 16} \quad w_{(4k+5)\bmod 16} \quad w_{(4k+6)\bmod 16} \quad w_{(4k+7)\bmod 16}], \\ \left. k = 0, 1, 2, 3 \right\}$$

[Equation 22]

The inner precoder $W^{(1)}$ is selected from the first codebook $C^{(1)}$.

Here, $$w_n = \begin{bmatrix} 1 \\ e^{j\frac{2\pi n}{16}} \end{bmatrix}, k = 0, 1, \ldots, 15$$

is satisfied and k is a codeword index of $C^{(1)}$. In addition, $C^{(1)}(k)$ is a $k^{th}$ codeword of the codebook $C^{(1)}$.

The outer precoder $W^{(2)}$ for rank 2 transmission is selected from the second codebook $C_2^{(2)}$ of [Equation 23] below.

$$C_2^{(2)} = \left\{ \begin{bmatrix} Y_1 & Y_2 \\ a_1 Y_1 & -a_2 Y_2 \end{bmatrix}, \begin{bmatrix} Y_1 & Y_2 \\ ja_1 Y_1 & -ja_2 Y_2 \end{bmatrix} \right\}$$

[Equation 23]

$(Y_1, Y_2) \in \{(e_1, e_5), (e_2, e_6), (e_3, e_7)(e_4, e_8)\}$ $$C_2^{(2)} = \left\{ \begin{bmatrix} e_1 & e_5 \\ a_1 e_1 & -a_2 e_5 \end{bmatrix}, \begin{bmatrix} e_2 & e_6 \\ a_1 e_2 & -a_2 e_6 \end{bmatrix}, \\ \begin{bmatrix} e_3 & e_7 \\ a_1 e_3 & -a_2 e_7 \end{bmatrix}, \begin{bmatrix} e_4 & e_8 \\ a_1 e_4 & -a_2 e_8 \end{bmatrix}, \\ \begin{bmatrix} e_1 & e_5 \\ ja_1 e_1 & -ja_2 e_5 \end{bmatrix}, \begin{bmatrix} e_2 & e_6 \\ ja_1 e_2 & -ja_2 e_6 \end{bmatrix}, \\ \begin{bmatrix} e_3 & e_7 \\ ja_1 e_3 & -ja_2 e_7 \end{bmatrix}, \begin{bmatrix} e_4 & e_8 \\ ja_1 e_4 & -ja_2 e_8 \end{bmatrix} \right\}$$

Here, $e_n$ is a 4-element selection vector with all zeros except the nth element. l is the codeword index of $C_2^{(2)}$ and l=0, 1, 2, ..., 7. In addition, $C_2^{(2)}(l)$ is an $l^{th}$ codeword of the codebook $C_2^{(2)}$ and $a_1 = a_2 = e^{2j(\frac{2\pi}{16}(4k+l\bmod 4)\bmod 16)}$ is satisfied.

$C^{(1)}$ according to the first embodiment of the present invention is generated using the same oversampled DFT vector like $C^{(1)}$ of [Equation 15] above.

However, distinguished from $C^{(1)}$ of [Equation 15] above, $C^{(1)}$ according to the first embodiment of the present invention is composed of eight consecutive oversampled DFT vectors in order to enable two beam vectors configuring the rank 2 codeword to have the LPI property. Since $C^{(1)}$ of [Equation 15] above is composed of four consecutive oversampled DFT vectors, even if an arbitrary vector included in $C^{(1)}$ is selected using $C^{(2)}$, the two beam vectors which are finally generated do not have the LPI property. That is, in [Equation 21] above, |m−n|=4 is not satisfied.

Accordingly, $C^{(1)}$ according to the first embodiment of the present invention is composed of a fatter matrix and the type of the DFT vector selected from $C^{(1)}$ via $C^{(2)}$ is increased.

That is, in [Equation 21] above, since 0<|m−n|<7, it may be possible to find m and n that satisfy |m−n|=4. As a result, the finally generated two beam vectors have LPI attribute.

A codeword having LPI property may be generated using $C^{(2)}$ according to the first embodiment of the present invention together with $C^{(1)}$ according to the first embodiment of the present invention. In $C^{(2)}$, $(Y_1, Y_2)$ is limited to $(e_i, e_{i+4})$. As a result, in [Equation 21] above, |m−n|=4 is always satisfied. In addition, according to [Equation 21] for enabling all beam vector configuring rank 2 to have the orthonomal property and the LPI property, in $C_2^{(2)}$ according to the first embodiment of the present invention, $a_1 = a_2 = e^{j\phi}$, where $$\phi = 2\left(\frac{2\pi}{16}n\right), n = (4k + l\bmod 4)\bmod 16$$

is set.

Second Embodiment

According to a second embodiment of the present invention, [Equation 21] above is satisfied such that all vectors have LPI property and orthonomal property is satisfied according to $a_1=a_2$ among conditions based on [Equation 19] above.

$C^{(1)}$ and $C_2^{(2)}$ according to the second embodiment of the present invention are configured according to [Equation 24] below.

$$C^{(1)} = \left\{ \begin{bmatrix} \tilde{W}^{(1)} & 0 \\ 0 & \tilde{W}^{(1)} \end{bmatrix} \right\} \Bigg| \tilde{W}^{(1)} = \\ [w_{2k\bmod 8} \quad w_{(2k+1)\bmod 8} \quad w_{(2k+2)\bmod 8} \quad w_{(2k+3)\bmod 8}], \\ k = 0, 1, 2, 3 \right\}$$

[Equation 24]

The inner precoder $W^{(1)}$ is selected from the first codebook $C^{(1)}$.

Here, $$w_n = \begin{bmatrix} 1 \\ e^{j\frac{2\pi n}{8}} \end{bmatrix}, n = 0, 1, \ldots, 7$$

is satisfied and k is a codeword index of $C^{(1)}$. In addition, $C^{(1)}$ (k) is a $k^{th}$ codeword of the codebook $C^{(1)}$.

The outer precoder $W^{(2)}$ for rank 2 transmission is selected from the second codebook $C_2^{(2)}$ of [Equation 25] below.

$$C_2^{(2)} = \left\{ \begin{bmatrix} Y_1 & Y_2 \\ a_1 Y_1 & -a_2 Y_2 \end{bmatrix}, \begin{bmatrix} Y_1 & Y_2 \\ ja_1 Y_1 & -ja_2 Y_2 \end{bmatrix} \right\} \quad \text{[Equation 25]}$$

$(Y_1, Y_2) \in \{(e_1, e_3), (e_2, e_4)\}$ $$C_2^{(2)} = \left\{ \begin{bmatrix} e_1 & e_3 \\ a_1 e_1 & -a_2 e_3 \end{bmatrix}, \begin{bmatrix} e_2 & e_4 \\ a_1 e_2 & -a_2 e_4 \end{bmatrix}, \begin{bmatrix} e_1 & e_3 \\ ja_1 e_1 & -ja_2 e_3 \end{bmatrix}, \begin{bmatrix} e_2 & e_4 \\ ja_1 e_2 & -ja_2 e_4 \end{bmatrix} \right\}$$

Here, $e_n$ is a 4-element selection vector with all zeros except the nth element. l is the codeword index of $C_2^{(2)}$ and l=0, 1, 2, 3. In addition, $C_2^{(2)}$ (l) is an $l^{th}$ codeword of the codebook $$C_2^{(2)} \text{ and } a_1 = a_2 = e^{2j\left(\frac{2\pi}{16}(2k+l\bmod 2)\bmod 8\right)}$$

is satisfied.

$C^{(1)}$ according to the second embodiment of the present invention is composed of a matrix having the same size as $C^{(1)}$ of [Equation 15] above.

However, distinguished from $C^{(1)}$ of [Equation 15] above, $C^{(1)}$ according to the second embodiment of the present invention is composed of a DFT vector oversampled fourfold instead of eightfold in order to enable two beam vectors configuring the rank 2 codeword to have the LPI property. Since $C^{(1)}$ of [Equation 15] above is composed of a DFT vector oversampled eightfold, even if an arbitrary vector included in $C^{(1)}$ is selected using $C^{(2)}$, the two beam vectors which are finally generated do not have the LPI property.

Accordingly, $C^{(1)}$ according to the second embodiment of the present invention may be composed of a DFT vector oversampled fourfold and two beam vectors have LPI property via $C^{(2)}$.

In the first embodiment of the present invention, in order to enable the two beam vectors selected via $C^{(2)}$ to have the LPI property, |m−n|=4 needs to be satisfied. However, the first embodiment of the present invention corresponds to the case in which $C^{(1)}$ includes a DFT vector oversampled eightfold. Since $C^{(1)}$ according to the second embodiment of the present invention is composed of a DFT vector oversampled fourfold, instead of |m−n|=4, |m−n|=2 needs to be satisfied. In order to satisfy this condition, $(Y_1, Y_2) \in \{(e_1, e_3), (e_2, e_4)\}$ is set in [Equation 25] above. In addition, according to [Equation 21] for enabling all beam vectors configuring rank 2 to have the orthonomal property and the LPI property, $C^{(1)}$ according to the second embodiment of the present invention is set according to $$a_1 = a_2 = e^{j\phi}, \text{ where } \phi = 2\frac{2\pi}{16}(n), n = (2k+l\bmod 2)\bmod 8.$$

Third Embodiment

According to a third embodiment of the present invention, [Equation 21] above is satisfied such that all vectors have LPI property and orthonomal property is satisfied according to $v_n^H v_m = 0$ among conditions based on [Equation 19] above.

In [Equation 19] above, when $v_n^H v_m = 0$ is satisfied, two beam vectors of rank 2 are always orthonomal with respect to arbitrary $a_1, a_2$. Accordingly, a codebook is designed to satisfy $v_n^H v_m = 0$ and, when $a_1, a_2$ are calculated such that the beam vector corresponding to each rank has LPI property, a codebook having both orthonomal property and LPI property is generated.

The codebook according to the third embodiment of the present invention is configured according to [Equation 26] below.

$$C^{(1)} = \left\{ \begin{bmatrix} \tilde{w}^{(1)} & 0 \\ 0 & \tilde{w}^{(1)} \end{bmatrix} \middle| \begin{array}{l} \tilde{w}^{(1)} = \\ \left[ w_{2k\bmod 16} \; w_{(2k+1)\bmod 16} \; w_{(2k+2)\bmod 16} \; \cdots \; w_{(2k+15)\bmod 16} \right], \\ k = 0 \end{array} \right\} \quad \text{[Equation 26]}$$

The inner precoder $W^{(1)}$ is selected from the first codebook $C^{(1)}$.

Here, $$w_n = \begin{bmatrix} 1 \\ e^{j\frac{2\pi n}{16}} \end{bmatrix}, n = 0, 1, \ldots, 15$$

is satisfied and k is a codeword index of $C^{(1)}$. In addition, $C^{(1)}$ (k) is a k codeword of the codebook $C^{(1)}$.

The outer precoder $W^{(2)}$ for rank 2 transmission is selected from the second codebook $C_2^{(2)}$ according to [Equation 27] below.

$$C_2^{(2)} = \left\{ \begin{bmatrix} Y_1 & Y_2 \\ a_1 Y_1 & -a_2 Y_2 \end{bmatrix}, \begin{bmatrix} Y_1 & Y_2 \\ ja_1 Y_1 & -ja_2 Y_2 \end{bmatrix} \right\} \quad \text{[Equation 27]}$$

$(Y_1, Y_2) \in$

-continued $$C_2^{(2)} = \left\{ \begin{array}{c} (e_1, e_9), (e_2, e_{10}), (e_3, e_{11}), (e_4, e_{12}), \\ (e_5, e_{13}), (e_6, e_{14}), (e_7, e_{15}), (e_8, e_{16}) \end{array} \right\}$$

$$C_2^{(2)} = \left\{ \begin{bmatrix} e_1 & e_9 \\ a_1 e_1 & -a_2 e_9 \end{bmatrix}, \begin{bmatrix} e_2 & e_{10} \\ a_1 e_2 & -a_2 e_{10} \end{bmatrix}, \\ \begin{bmatrix} e_3 & e_{11} \\ a_1 e_3 & -a_2 e_{11} \end{bmatrix}, \begin{bmatrix} e_4 & e_{12} \\ a_1 e_4 & -a_2 e_{12} \end{bmatrix}, \\ \begin{bmatrix} e_5 & e_{13} \\ a_1 e_5 & -a_2 e_{13} \end{bmatrix}, \begin{bmatrix} e_6 & e_{14} \\ a_1 e_6 & -a_2 e_{14} \end{bmatrix}, \\ \begin{bmatrix} e_7 & e_{15} \\ a_1 e_7 & -a_2 e_{15} \end{bmatrix}, \begin{bmatrix} e_8 & e_{16} \\ a_1 e_8 & -a_2 e_{16} \end{bmatrix}, \\ \begin{bmatrix} e_1 & e_9 \\ ja_1 e_1 & -ja_2 e_9 \end{bmatrix}, \begin{bmatrix} e_2 & e_{10} \\ ja_1 e_2 & -ja_2 e_{10} \end{bmatrix}, \\ \begin{bmatrix} e_3 & e_{11} \\ ja_1 e_3 & -ja_2 e_{11} \end{bmatrix}, \begin{bmatrix} e_4 & e_{12} \\ ja_1 e_4 & -ja_2 e_{12} \end{bmatrix}, \\ \begin{bmatrix} e_5 & e_{13} \\ ja_1 e_5 & -ja_2 e_{13} \end{bmatrix}, \begin{bmatrix} e_6 & e_{14} \\ ja_1 e_6 & -ja_2 e_{14} \end{bmatrix}, \\ \begin{bmatrix} e_7 & e_{15} \\ ja_1 e_7 & -ja_2 e_{15} \end{bmatrix}, \begin{bmatrix} e_8 & e_{16} \\ ja_1 e_8 & -ja_2 e_{16} \end{bmatrix} \right\}$$

Here, $e_n$ is a 4-element selection vector with all zeros except the nth element. l is the codeword index of $C_2^{(2)}$ and l=0, 1, 2, . . . , 15 is satisfied. In addition, $C_2^{(2)}$ (l) is an ith codeword of the codebook $$C_2^{(2)} \text{ and } a_1 = e^{2j\left(\frac{2\pi}{16}(l \bmod 8)\right)}, a_2 = e^{2j\left(\frac{2\pi}{16}((l \bmod 8)+8)\right)+j\pi}$$

is satisfied.

$C^{(1)}$ according to the third embodiment of the present invention is composed of a DFT vector oversampled eight-fold and has one codeword composed of all DFT vectors. $v_n^H v_m = 0$ in [Equation 19] is satisfied by restricting $(Y_1, Y_2) = \{e_i, e_{i+8}\}$ of $C_2^{(2)}$ according to the third embodiment of the present invention. That is, in the rank 2 codeword generated according to Equations 26 and 27, two beam vectors are orthonormal and $a_1$ and $a_2$ are set according to [Equation 27] above such that each beam vector has LPI property.

Although rank 2 is assumed in the aforementioned first to third embodiments of the present invention, the scope of the present invention is not limited to rank 2 and includes an arbitrary codebook satisfying LPI property and orthonormal property using the aforementioned method at high rank such as rank 2 or more. In addition, the case in which some of the rank 2 codebook described in the aforementioned embodiments is subsampled or an arbitrary codebook including the codebook is included in the scope of the present invention.

Embodiment 4-1

According to embodiment 4-1 of the present invention, the aforementioned condition is satisfied and the inner precoder $W^{(1)}$ and the outer precoder $W^{(2)}$ are set to 4 bits and 1 bit, respectively.

First, $W^{(1)}$ may be set according to [Equation 28] below.

$$W_1(l) = \begin{bmatrix} \tilde{W}_1(l) & 0 \\ 0 & \tilde{W}_1(l) D_a(l) \end{bmatrix}, \quad \text{[Equation 28]}$$

$l \in \{0, 1, , 2, \ldots, 15\}$

Here, $\tilde{W}_1(l)$ is set according to [Equation 29] below.

$$\tilde{W}_1(l) = \quad \text{[Equation 29]}$$

$$[w_{(l)\bmod 16} \ w_{(l+1)\bmod 16} \ \cdots \ w_{(l+6)\bmod 16} \ w_{(l+7)\bmod 16}],$$

$$w_n = \begin{bmatrix} 1 \\ e^{j\frac{2\pi n}{16}} \end{bmatrix}$$

In addition, according to [Equation 30] below, $D_a(l)$ is composed of a $p^{th}$ row and a $q^{th}$ column, where p and q are started from 0.

$$\{D_a(l)\}_{pq} = \begin{cases} e^{2 \cdot j \frac{2\pi \cdot ((l+p \bmod 4)) \bmod 16)}{16}}, & p = q \\ 0, & p \neq q \end{cases} \quad \text{[Equation 30]}$$

$W^{(2)}$ may be set according to the following equation.

$$W_2(n_1, n_2) = \begin{bmatrix} e_{n_1} & e_{n_2} \\ e_{n_1} & -e_{n_2} \end{bmatrix}, (n_1, n_2) \in \{(1, 5), (3, 7)\} \text{ or}$$

$$W_2(n_1, n_2) = \begin{bmatrix} e_{n_1} & e_{n_2} \\ e_{n_1} & -e_{n_2} \end{bmatrix}, (n_1, n_2) \in \{(1, 5), (2, 6)\}.$$

Embodiment 4-2

According to embodiment 4-2 of the present invention, the aforementioned condition is satisfied and the inner precoder $W^{(1)}$ and the outer precoder $W^{(2)}$ are set to 3 bits and 2 bits, respectively.

First, $W^{(1)}$ may be set according to [Equation 31] below.

$$W_1(l) = \begin{bmatrix} \tilde{W}_1(l) & 0 \\ 0 & \tilde{W}_1(l) D_a(l) \end{bmatrix}, l \in \{0, 1, 2, \ldots, 7\} \quad \text{[Equation 31]}$$

Here, $\tilde{W}_1(l)$ is set according to [Equation 32] below.

$$\tilde{W}_1(l) = \quad \text{[Equation 32]}$$

$$[w_{(2l)\bmod 16} \ w_{(2l+1)\bmod 16} \ \cdots \ w_{(2l+6)\bmod 16} \ w_{(2l+7)\bmod 16}],$$

$$w_n = \begin{bmatrix} 1 \\ e^{j\frac{2\pi n}{16}} \end{bmatrix}$$

In addition, according to the following equation, $D_a(l)$ is composed of a $p^{th}$ row and a $q^{th}$ column, where p and q are started from 0.

$$\{D_a(l)\}_{pq} = \begin{cases} e^{2 \cdot j \frac{2\pi \cdot ((2l+p \bmod 4)) \bmod 16)}{16}}, & p = q \\ 0, & p \neq q \end{cases} \quad \text{[Equation 33]}$$

$W^{(2)}$ may be set according to the following equation.

$$W_2(n_1, n_2) = \begin{bmatrix} e_{n_1} & e_{n_2} \\ e_{n_1} & -e_{n_2} \end{bmatrix}, (n_1, n_2) \in \{(1, 5), (2, 6), (3, 7), (4, 8)\}.$$

Embodiment 4-3

According to embodiment 4-3 of the present invention, the aforementioned condition is satisfied and the inner precoder $W^{(1)}$ and the outer precoder $W^{(2)}$ are set to 3 bits and 1 bit, respectively.

First, $W^{(1)}$ may be set according to [Equation 34] below.

$$W_1(l) = \begin{bmatrix} \tilde{W}_1(l) & 0 \\ 0 & \tilde{W}_1(l)D_a(l) \end{bmatrix}, l \in \{0, 1, 2, \ldots, 7\} \quad \text{[Equation 34]}$$

Here, $\tilde{W}_1(l)$ is set according to [Equation 35] below.

$$\tilde{W}_1(l) = \quad \text{[Equation 35]}$$

$$[w_{(2l)\bmod 16} \quad w_{(2l+1)\bmod 16} \quad \cdots \quad w_{(2l+6)\bmod 16} \quad w_{(2l+7)\bmod 16}],$$

$$w_n = \begin{bmatrix} 1 \\ e^{j\frac{2\pi n}{16}} \end{bmatrix}$$

In addition, according to [Equation 36] below, $D_a(l)$ is composed of a $p^{th}$ row and a $q^{th}$ column, where p and q are started from 0.

$$\{D_a(l)\}_{pq} = \begin{cases} e^{2 \cdot j \frac{2\pi \cdot ((2l+(p\bmod 4))\bmod 16)}{16}}, & p = q \\ 0, & p \neq q \end{cases} \quad \text{[Equation 36]}$$

$W^{(2)}$ may be set according to the following equation.

$$W_2(n_1, n_2) = \begin{bmatrix} e_{n_1} & e_{n_2} \\ e_{n_1} & -e_{n_2} \end{bmatrix}, (n_1, n_2) \in \{(1, 5), (3, 7)\} \text{ or}$$

$$W_2(n_1, n_2) = \begin{bmatrix} e_{n_1} & e_{n_2} \\ e_{n_1} & -e_{n_2} \end{bmatrix}, (n_1, n_2) \in \{(1, 5), (2, 6)\}.$$

Embodiment 4-4

According to embodiment 4-4 of the present invention, the aforementioned condition is satisfied and the inner precoder $W^{(1)}$ and the outer precoder $W^{(2)}$ are set to 4 bits and 2 bits, respectively.

First, $W^{(1)}$ is set according to [Equation 37] below.

$$W_1(l) = \begin{bmatrix} \tilde{W}_1(l) & 0 \\ 0 & \tilde{W}_1(l)D_a(l) \end{bmatrix}, l \in \{0, 1, 2, \ldots, 15\} \quad \text{[Equation 37]}$$

Here, $\tilde{W}_1(l)$ is set according to the following equation.

$$\tilde{W}_1(l) = \quad \text{[Equation 38]}$$

$$[w_{(l)\bmod 16} \quad w_{(l+1)\bmod 16} \quad \cdots \quad w_{(l+6)\bmod 16} \quad w_{(l+7)\bmod 16}],$$

$$w_n = \begin{bmatrix} 1 \\ e^{j\frac{2\pi n}{16}} \end{bmatrix}$$

In addition, according to the following equation, $D_a(l)$ is composed of a $p^{th}$ row and a $q^{th}$ column, where p and q are started from 0.

$$\{D_a(l)\}_{pq} = \begin{cases} e^{2 \cdot j \frac{2\pi \cdot ((l+(p\bmod 4))\bmod 16)}{16}}, & p = q \\ 0, & p \neq q \end{cases} \quad \text{[Equation 39]}$$

$W^{(2)}$ may be set according to the following equation.

$$W_2(n_1, n_2) = \begin{bmatrix} e_{n_1} & e_{n_2} \\ e_{n_1} & -e_{n_2} \end{bmatrix}, (n_1, n_2) \in \{(1, 5), (2, 6), (3, 7), (4, 8)\}.$$

With reference to FIG. 15, a method for uplink MIMO transmitting and receiving method will be described according to an exemplary embodiment of the present invention.

In operation S151, a UE may transmit first and second PMIs to a BS and the BS may receive the first and second PMIs. Prior to operation S151, the UE may measure a downlink channel from the BS to generate channel state information (CSI). The CSI may include R1, PMI, and CQI. Here, the PMI may include a first PMI (e.g., W1) and a second PMI (e.g., W2). In operation S151, the PMI may be transmitted to the BS. Here, the UE may transmit the first and second PMIs in the same uplink subframe or in different uplink subframes.

In operation S152, the BS may determine a precoding matrix to be applied to downlink transmission in consideration of the first and second PMIs received from the BS. The first and second PMIs transmitted from the UE may be information indicating a precoding matrix preferred by the UE and may constitute candidates of precoding matrices. Here, the codebook according to various embodiments of the present invention may be used as a codebook. For example, a codebook including W1s as precoding matrices indicated by the first PMI may be pre-shared by both the UE and the BS and may be configured as described according to the aforementioned various embodiments of the present invention. A codebook including W2s as precoding matrices indicated by the second PMI may also be pre-shared by both the UE and the BS and may be configured as described according to the aforementioned various embodiments of the present invention.

In operation S153, the BS may map a downlink signal to two or more layers.

In operation S154, the BS may perform precoding on the two or more layers to which the downlink signal is mapped, using a precoding matrix W. Here, the precoding matrix W may be determined based on W1 and W2.

In operation S155, the BS may transmit the precoded downlink signal to the UE and the UE may receive the downlink signal. After operation S155, the UE may process the received downlink signal based on the same precoding matrix as the precoding matrix W that is applied to the downlink signal by the BS (e.g., by performing inverse-precoding on the received downlink) to restore the downlink signal.

With regard to the codebook-based signal transmitting and receiving method of FIG. 15, the aforementioned various embodiments of the present invention are independently applied or two or more embodiments are simultaneously applied and descriptions of redundant parts are omitted for clarity.

In addition, the same idea as that proposed by the present invention can also be applied to uplink MIMO transmission and reception for MIMO transmission between a BS and a relay (in backhaul uplink and backhaul downlink) and MIMO transmission between a relay and a UE (in access uplink and access downlink).

BS and UE to which Embodiments of the Present Invention are Applicable

Figure 16:
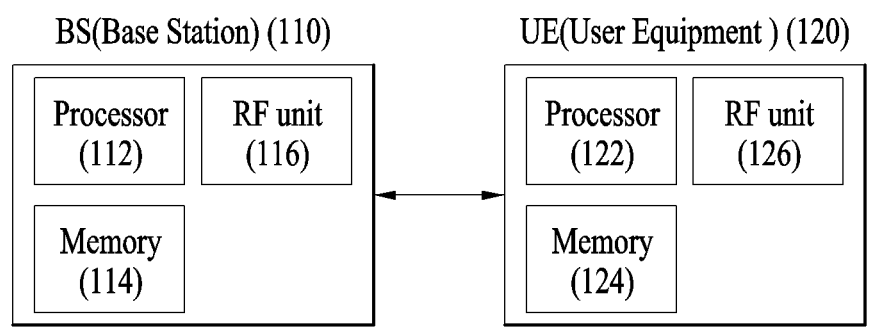
FIG. 16 is a diagram illustrating a BS and a UE to which an embodiment of the present invention is applicable.

FIG. 16 is a diagram illustrating a BS 110 and a UE 120 to which an embodiment of the present invention is applicable.

When a relay is included in a wireless communication system, communication in backhaul link is performed between the BS and the relay, and communication in access link is performed between the relay and the UE. Accordingly, the BS or the UE illustrated in FIG. 16 may be replaced by a relay as necessary.

Referring to FIG. 16, the wireless communication system includes a BS 110 and a UE 120. The BS 110 includes a processor 112, a memory 114, and a radio frequency (RF) unit 116. The processor 112 may be configured to embody procedures and/or methods proposed by the present invention. The memory 114 is connected to the processor 112 and stores various information related to an operation of the processor 112. The RF unit 116 is connected to the processor 112 and transmits and/or receives a radio signal. The UE 120 includes a processor 122, a memory 124, and an RF unit 126. The processor 122 may be configured to embody procedures and/or methods proposed by the present invention. The memory 124 is connected to the processor 122 and stores various information related to an operation of the processor 122. The RF unit 126 is connected to the processor 122 and transmits and/or receives a radio signal. The BS 110 and/or the UE 120 may have a single antenna or a multiple antenna.

The embodiments of the present invention described herein below are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by a subsequent amendment after the application is filed.

In the embodiments of the present invention, a specific operation described as being performed by the BS may be performed by an upper node of the BS. Namely, it is apparent that, in a network comprised of a plurality of network nodes including a BS, various operations performed for communication with a UE may be performed by the BS, or network nodes other than the BS. The term 'BS' may be replaced with a fixed station, a Node B, an eNode B (eNB), an access point, etc.

The embodiments according to the present invention can be implemented by various means, for example, hardware, firmware, software, or combination thereof. In a hardware configuration, the embodiments of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, the embodiments of the present invention can be implemented by a type of a module, a procedure, or a function, which performs functions or operations described above. Software code may be stored in a memory unit and then may be executed by a processor.

The memory unit may be located inside or outside the processor to transmit and receive data to and from the processor through various means which are well known.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

INDUSTRIAL APPLICABILITY

The above-described embodiments of the present invention can be applied to a wireless communication system such as a user equipment (UE), a relay, a base station (BS), etc.

The invention claimed is:

1. A method for transmitting a downlink signal by a base station in a wireless communication system, the method comprising:
receiving first and second precoding matrix indicators (PMIs) from a user equipment;
determining a first matrix W1 from a first codebook based on the first PMI, determining a second matrix W2 from a second codebook based on the second PMI, and determining a precoding matrix W based on the first matrix W1 and the second matrix W2;
precoding the downlink signal using two or more layers onto which the downlink signal mapped and the determined precoding matrix W; and
transmitting the precoded downlink signal to the user equipment,
wherein all precoding vectors included in the precoding matrix W have a property that phases of the all precoding vectors increase in proportion to precoding vector indexes and are orthonormal to each other,
wherein:
the first codebook is configured according to the following equation, $$C^{(1)} = \left\{ \begin{bmatrix} \tilde{W}^{(1)} & 0 \\ 0 & \tilde{W}^{(1)} \end{bmatrix} \middle| \begin{array}{l} \tilde{W}^{(1)} = [w_{2k \bmod 16} \quad w_{(2k+1) \bmod 16} \quad w_{(2k+2) \bmod 16} \quad \cdots \quad w_{(2k+15) \bmod 16}], \\ k = 0 \end{array} \right\}$$

Wn is configured according to the following equation, $$w_n = \begin{bmatrix} 1 \\ e^{j\frac{2\pi n}{16}} \end{bmatrix}, n = 0, 1, \ldots, 15$$

k is a precoding vector index of the first codebook;
the second codebook is configured according to the following equation, $$C_2^{(2)} = \left\{ \begin{bmatrix} Y_1 & Y_2 \\ a_1 Y_1 & -a_2 Y_2 \end{bmatrix}, \begin{bmatrix} Y_1 & Y_2 \\ ja_1 Y_1 & -ja_2 Y_2 \end{bmatrix} \right\}$$

$$(Y_1, Y_2) \in \left\{ \begin{array}{l} (e_1, e_9), (e_2, e_{10}), (e_3, e_{11}), (e_4, e_{12}), \\ (e_5, e_{13}), (e_6, e_{14}), (e_7, e_{15}), (e_8, e_{16}) \end{array} \right\}$$

$e_n$ is a 4-element selection vector with all zeros except the nth element, and a1 and a2 are configured according to the following equation, $$a_1 = e^{2j\left(\frac{2\pi}{16}(l \bmod 8)\right)}, a_2 = e^{2j\left(\frac{2\pi}{16}((l \bmod 8)+8)\right)+j\pi};$$

and
l is a precoding vector index of the second codebook.

2. A method for receiving a downlink signal by a user equipment in a wireless communication system, the method comprising:
transmitting first and second precoding matrix indicators (PMIs) to a base station;
receiving a downlink signal which is precoded using two or more layers onto which the downlink signal mapped and a precoding matrix W calculated based on a first matrix W1 determined from a first codebook based on the first PMI and a second matrix W2 determined from a second codebook based on the second PMI, from the base station; and
processing the downlink signal using the precoding matrix W,
wherein all precoding vectors included in the precoding matrix W have a property that phases of the all precoding vectors increase in proportion to precoding vector indexes and are orthonormal to each other,
wherein:
the first codebook is configured according to the following equation, $$C^{(1)} = \left\{ \begin{bmatrix} \tilde{W}^{(1)} & 0 \\ 0 & \tilde{W}^{(1)} \end{bmatrix} \middle| \begin{array}{l} \tilde{W}^{(1)} = [w_{2k \bmod 16} \ w_{(2k+1) \bmod 16} \ w_{(2k+2) \bmod 16} \ \ldots \ w_{(2k+15) \bmod 16}], \\ k = 0 \end{array} \right\}$$

Wn is configured according to the following equation, $$w_n = \begin{bmatrix} 1 \\ e^{j\frac{2\pi n}{16}} \end{bmatrix}, n = 0, 1, \ldots, 15$$

k is a precoding vector index of the first codebook;
the second codebook is configured according to the following equation, $$C_2^{(2)} = \left\{ \begin{bmatrix} Y_1 & Y_2 \\ a_1 Y_1 & -a_2 Y_2 \end{bmatrix}, \begin{bmatrix} Y_1 & Y_2 \\ ja_1 Y_1 & -ja_2 Y_2 \end{bmatrix} \right\}$$

$$(Y_1, Y_2) \in \left\{ \begin{array}{l} (e_1, e_9), (e_2, e_{10}), (e_3, e_{11}), (e_4, e_{12}), \\ (e_5, e_{13}), (e_6, e_{14}), (e_7, e_{15}), (e_8, e_{16}) \end{array} \right\}$$

$e_n$ is a 4-element selection vector with all zeros except the nth element, and a1 and a2 are configured according to the following equation, $$a_1 = e^{2j\left(\frac{2\pi}{16}(l \bmod 8)\right)}, a_2 = e^{2j\left(\frac{2\pi}{16}((l \bmod 8)+8)\right)+j\pi};$$

and
l is a precoding vector index of the second codebook.

3. A base station for transmitting a downlink signal in a wireless communication system, the base station comprising:
a radio frequency (RF) unit; and
a processor,
wherein:
the processor is configured to receive first and second precoding matrix indicators (PMIs) from a user equipment, to determine a first matrix W1 from a first codebook based on the first PMI, to determine a second matrix W2 from a second codebook based on the second PMI, to determine a precoding matrix W based on the first matrix W1 and the second matrix W2, to precode the downlink signal using two or more layers onto which the downlink signal mapped and the determined precoding matrix W, and to transmit the precoded downlink signal to the user equipment; and
all precoding vectors included in the precoding matrix W have a property that phases of the all precoding vectors increase in proportion to precoding vector indexes and are orthonormal to each other,
wherein:
the first codebook is configured according to the following equation, $$C^{(1)} = \left\{ \begin{bmatrix} \tilde{W}^{(1)} & 0 \\ 0 & \tilde{W}^{(1)} \end{bmatrix} \middle| \begin{array}{l} \tilde{W}^{(1)} = [w_{2k \bmod 16} \ w_{(2k+1) \bmod 16} \ w_{(2k+2) \bmod 16} \ \ldots \ w_{(2k+15) \bmod 16}], k = 0 \end{array} \right\}$$

Wn is configured according to the following equation, $$w_n = \begin{bmatrix} 1 \\ e^{j\frac{2\pi n}{16}} \end{bmatrix}, n = 0, 1, \ldots, 15$$

k is a precoding vector index of the first codebook;
the second codebook is configured according to the following equation, $$C_2^{(2)} = \left\{ \begin{bmatrix} Y_1 & Y_2 \\ a_1 Y_1 & -a_2 Y_2 \end{bmatrix}, \begin{bmatrix} Y_1 & Y_2 \\ ja_1 Y_1 & -ja_2 Y_2 \end{bmatrix} \right\}$$
$$(Y_1, Y_2) \in \{(e_1, e_9), (e_2, e_{10}), (e_3, e_{11}),$$
$$(e_4, e_{12}), (e_5, e_{13}), (e_6, e_{14}), (e_7, e_{15}), (e_8, e_{16})\}$$

$e_n$ is a 4-element selection vector with all zeros except the nth element, and a1 and a2 are configured according to the following equation, $$a_1 = e^{2j\left(\frac{2\pi}{16}(l \bmod 8)\right)}, \quad a_2 = e^{2j\left(\frac{2\pi}{16}((l \bmod 8)+8)\right)+j\pi};$$

and l is a precoding vector index of the second codebook.

4. A user equipment for transmitting channel state information (CSI) in a wireless communication system, the user equipment comprising:

a radio frequency (RF) unit; and a processor, wherein:

the processor is configured to transmit first and second precoding matrix indicators (PMIs) to a base station, to receive a downlink signal which is precoded using two or more layers onto which the downlink signal mapped and a precoding matrix W calculated based on a first matrix W1 determined from a first codebook based on the first PMI and a second matrix W2 determined from a second codebook based on the second PMI, from the base station, and to process the downlink signal using the precoding matrix W; and all precoding vectors included in the precoding matrix W have a property that phases of the all precoding vectors increase in proportion to precoding vector indexes and are orthonormal to each other, wherein:

the first codebook is configured according to the following equation, $$C^{(1)} = \left\{ \begin{bmatrix} \tilde{W}^{(1)} & 0 \\ 0 & \tilde{W}^{(1)} \end{bmatrix} \right\}$$
$$\tilde{W}^{(1)} = [w_{2k \bmod 16} \; w_{(2k+1) \bmod 16} \; w_{(2k+2) \bmod 16} \; \cdots \; w_{(2k+15) \bmod 16}], k = 0$$

Wn is configured according to the following equation, $$w_n = \begin{bmatrix} 1 \\ e^{j\frac{2\pi n}{16}} \end{bmatrix}, n = 0, 1, \ldots, 15$$

k is a precoding vector index of the first codebook;

the second codebook is configured according to the following equation, $$C_2^{(2)} = \left\{ \begin{bmatrix} Y_1 & Y_2 \\ a_1 Y_1 & -a_2 Y_2 \end{bmatrix}, \begin{bmatrix} Y_1 & Y_2 \\ ja_1 Y_1 & -ja_2 Y_2 \end{bmatrix} \right\}$$
$$(Y_1, Y_2) \in \{(e_1, e_9), (e_2, e_{10}), (e_3, e_{11}),$$
$$(e_4, e_{12}), (e_5, e_{13}), (e_6, e_{14}), (e_7, e_{15}), (e_8, e_{16})\}$$

$e_n$ is a 4-element selection vector with all zeros except the nth element, and a1 and a2 are configured according to the following equation, $$a_1 = e^{2j\left(\frac{2\pi}{16}(l \bmod 8)\right)}, \quad a_2 = e^{2j\left(\frac{2\pi}{16}((l \bmod 8)+8)\right)+j\pi};$$

and l is a precoding vector index of the second codebook.

* * * * *